United States Patent [19]
Ohsawa

[11] Patent Number: 5,557,365
[45] Date of Patent: Sep. 17, 1996

[54] CAMERA ATTACHED WITH AUXILIARY DEVICE

[75] Inventor: Toshifumi Ohsawa, Tokyo, Japan

[73] Assignee: Canon Kabushiki Kaisha, Tokyo, Japan

[21] Appl. No.: 208,137

[22] Filed: Mar. 9, 1994

[30] Foreign Application Priority Data

Mar. 10, 1993 [JP] Japan .................................. 5-075012

[51] Int. Cl.$^6$ .......................................... G03B 7/26
[52] U.S. Cl. .......................................... 354/484; 354/286
[58] Field of Search ........................... 354/127.12, 173.1, 354/286, 418, 484

[56] References Cited

U.S. PATENT DOCUMENTS

| | | | |
|---|---|---|---|
| 4,897,807 | 1/1990 | Ohsawa | 364/707 |
| 4,958,175 | 9/1990 | Asakura et al. | 354/484 |
| 5,107,290 | 4/1992 | Ohsawa | 354/173.1 |

*Primary Examiner*—David M. Gray
*Attorney, Agent, or Firm*—Fitzpatrick, Cella, Harper & Scinto

[57] ABSTRACT

This invention relates to a battery check circuit of a camera which mounts, e.g., an interchangeable lens. In this invention, the number of motors in the interchangeable lens is informed to the camera via a communication, and a battery check level according to the number of motors is automatically set, thereby performing a high-precision battery check operation.

26 Claims, 19 Drawing Sheets

FIG. 4

| V_BAT VOLTAGE | BL LEVEL | SINGLE MOTOR CASE | TWO MOTORS CASE | THREE MOTORS CASE |
|---|---|---|---|---|
| MORE THAN 5.0V | 4 | POSSIBLE TO OPERATE | POSSIBLE TO OPERATE | POSSIBLE TO OPERATE |
| 4.9V ∼ 4.0V | 3 | POSSIBLE TO OPERATE | POSSIBLE TO OPERATE | POSSIBLE TO OPERATE |
| 3.9V ∼ 3.0V | 2 | POSSIBLE TO OPERATE | POSSIBLE TO OPERATE | INHIBITION |
| 2.9V ∼ 2.5V | 1 | POSSIBLE TO OPERATE | INHIBITION | INHIBITION |
| LESS THAN 2.4V | 0 | INHIBITION | INHIBITION | INHIBITION |

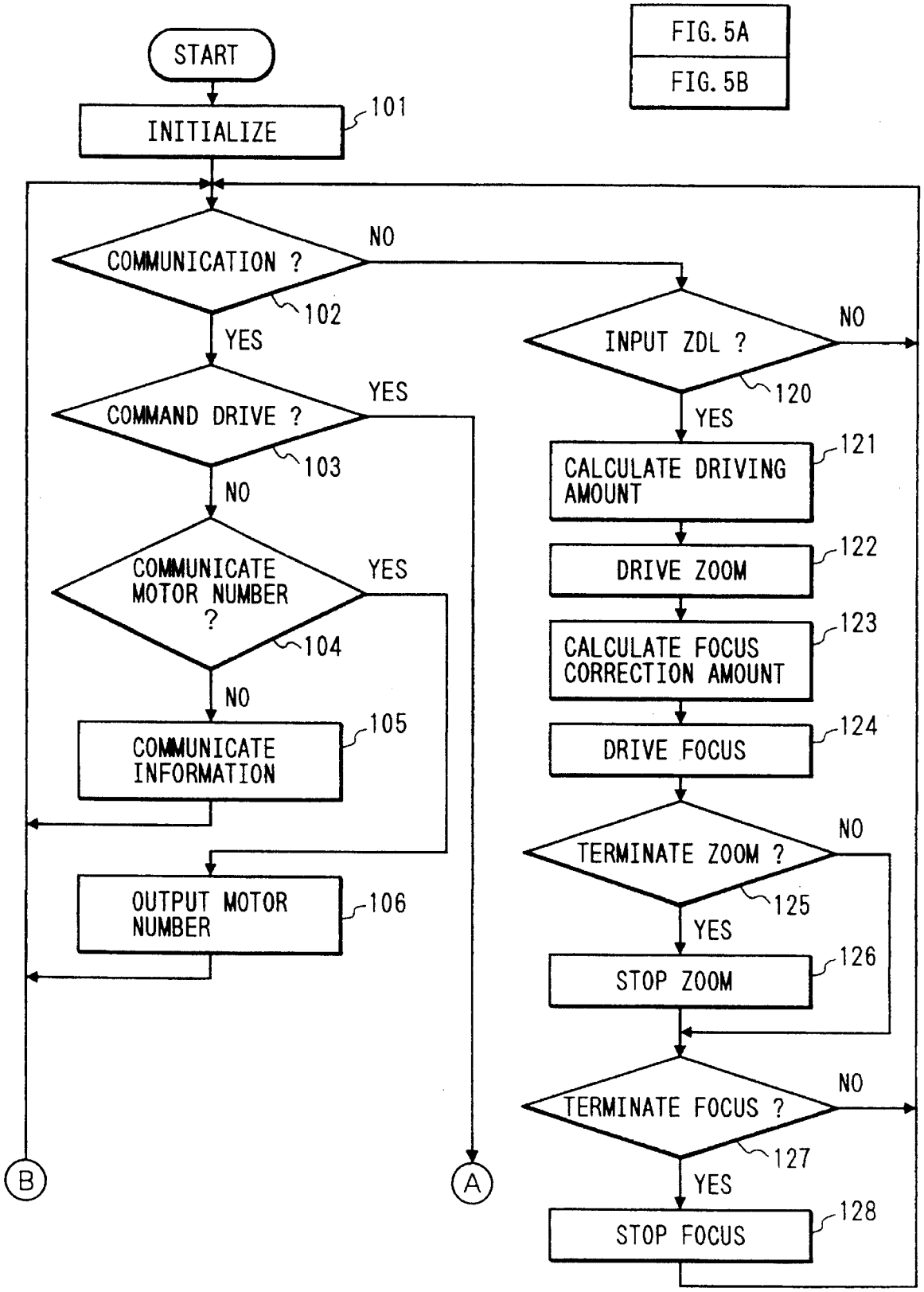

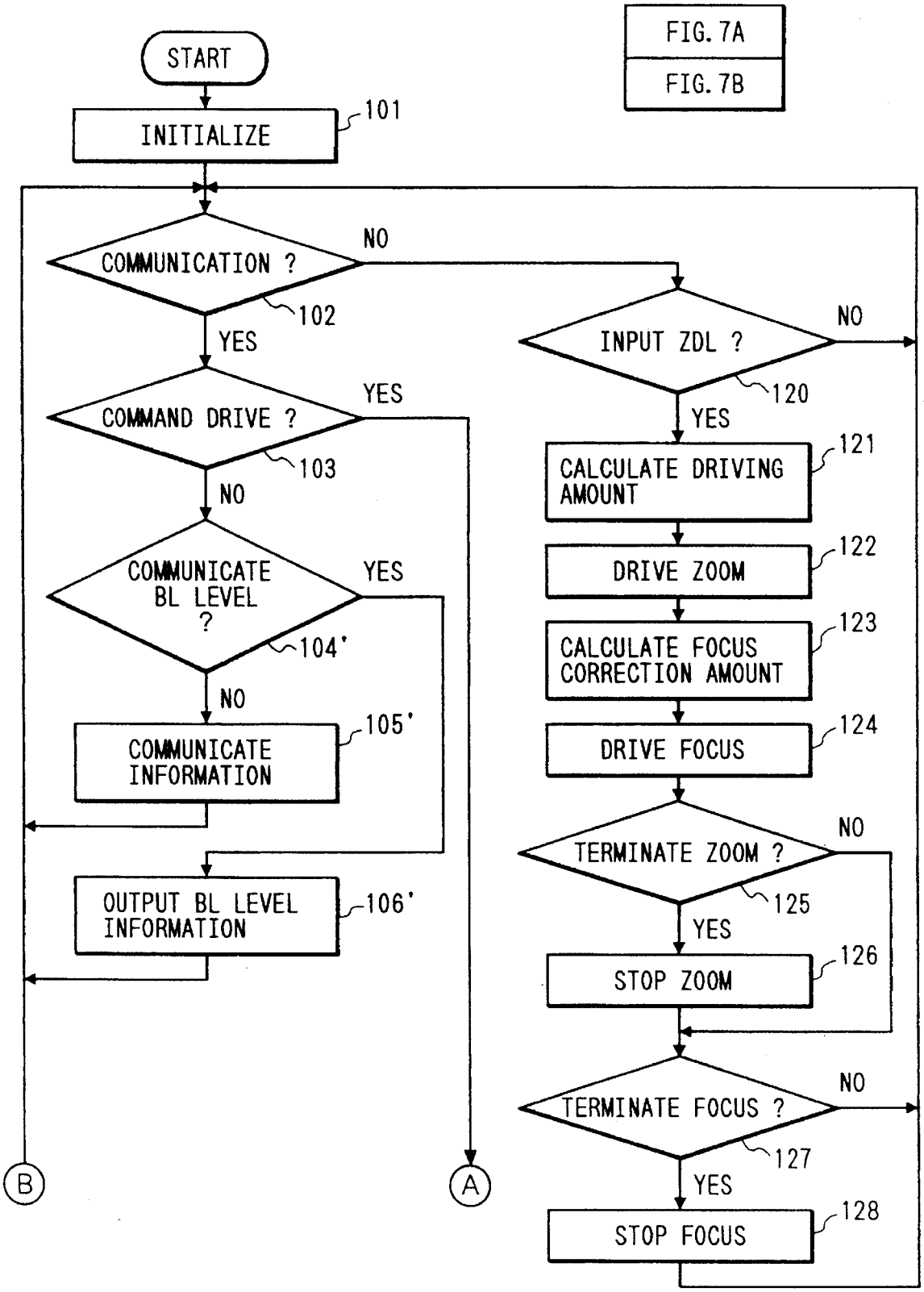

FIG. 8

| LENS NAME | FOR FOCUS | FOR IRIS | FOR ZOOM | FOR IS |
|---|---|---|---|---|
| A | 1.0W | 0.5W | — | — |
| B | 1.0W | 0.5W | 1.0W | — |
| C | 1.0W | 0.5W | 1.0W | 0.5W |

FIG. 9

| $V_{BAT}$ VOLTAGE | BL LEVEL | POSSIBLE TO SUPPLY AN ELECTRICAL POWER |
|---|---|---|
| MORE THAN 5.0V | 4 | 3.0W |
| 4.9V ∫ 4.0V | 3 | 2.0W |
| 3.9V ∫ 3.0V | 2 | 1.5W |
| 2.9V ∫ 2.5V | 1 | 1.0W |
| LESS THAN 2.4V | 0 | INHIBITION |

FIG. 10

| LENS NAME | FOR FOCUS HIGH SPEED / LOW SPEED | FOR IRIS | FOR ZOOM HIGH SPEED / LOW SPEED | FOR IS |
|---|---|---|---|---|
| A | 1.0W / 0.5W | 0.5W | — | — |
| B | 1.0W / 0.5W | 0.5W | 1.0W / 0.5W | — |
| C | 1.0W / 0.5W | 0.5W | 1.0W / 0.5W | 0.5W |

FIG. 12

| $V_{BAT}$ VOLTAGE | BL LEVEL | AVAILABLE MOTOR DRIVING NUMBER |
|---|---|---|
| MORE THAN 5.0V | 4 | 3 |
| 4.9V ∽ 4.0V | 3 | 2 |
| 3.9V ∽ 3.0V | 2 | 1 |
| 2.9V ∽ 2.5V | 1 | 1 |
| LESS THAN 2.4V | 0 | INHIBITION |

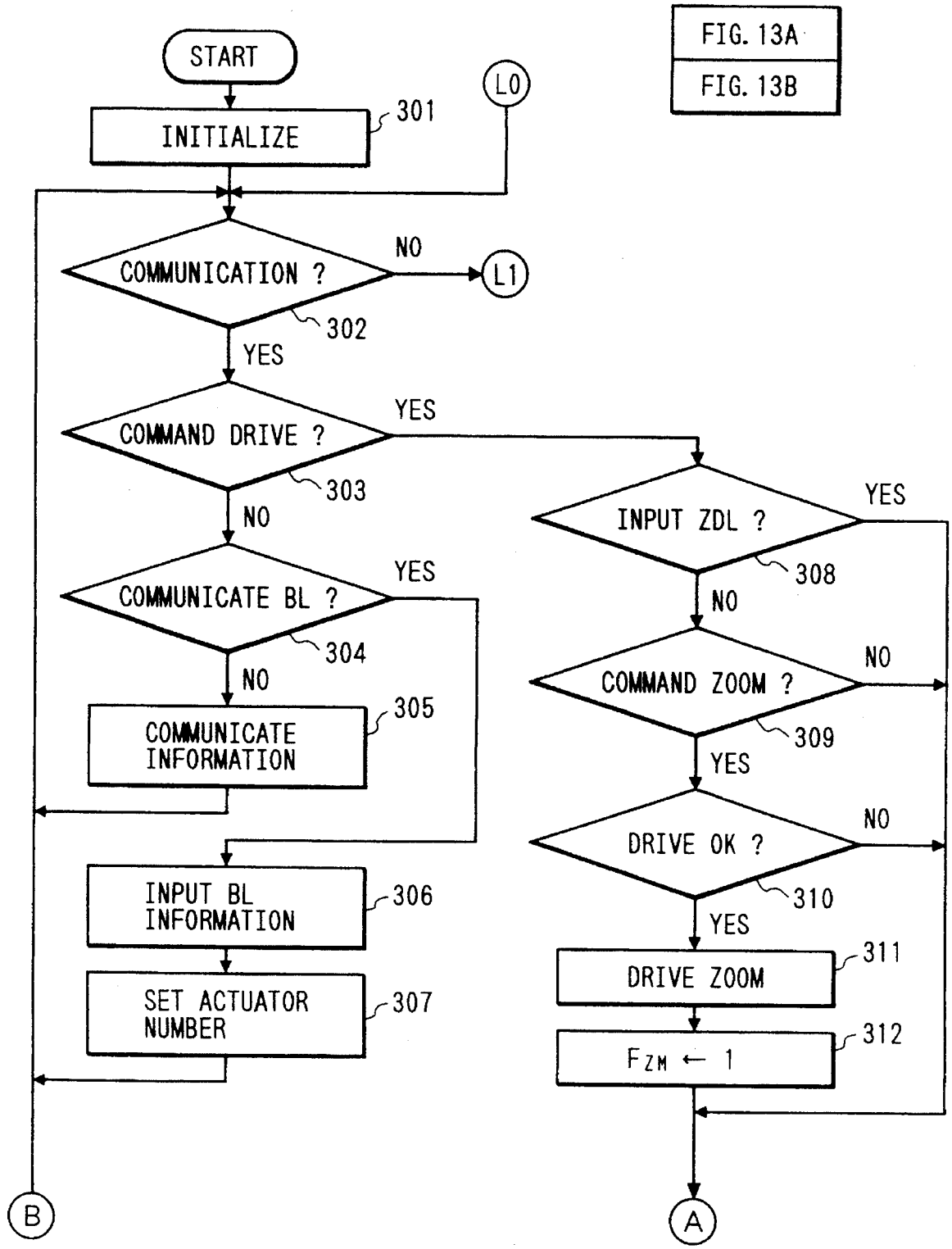

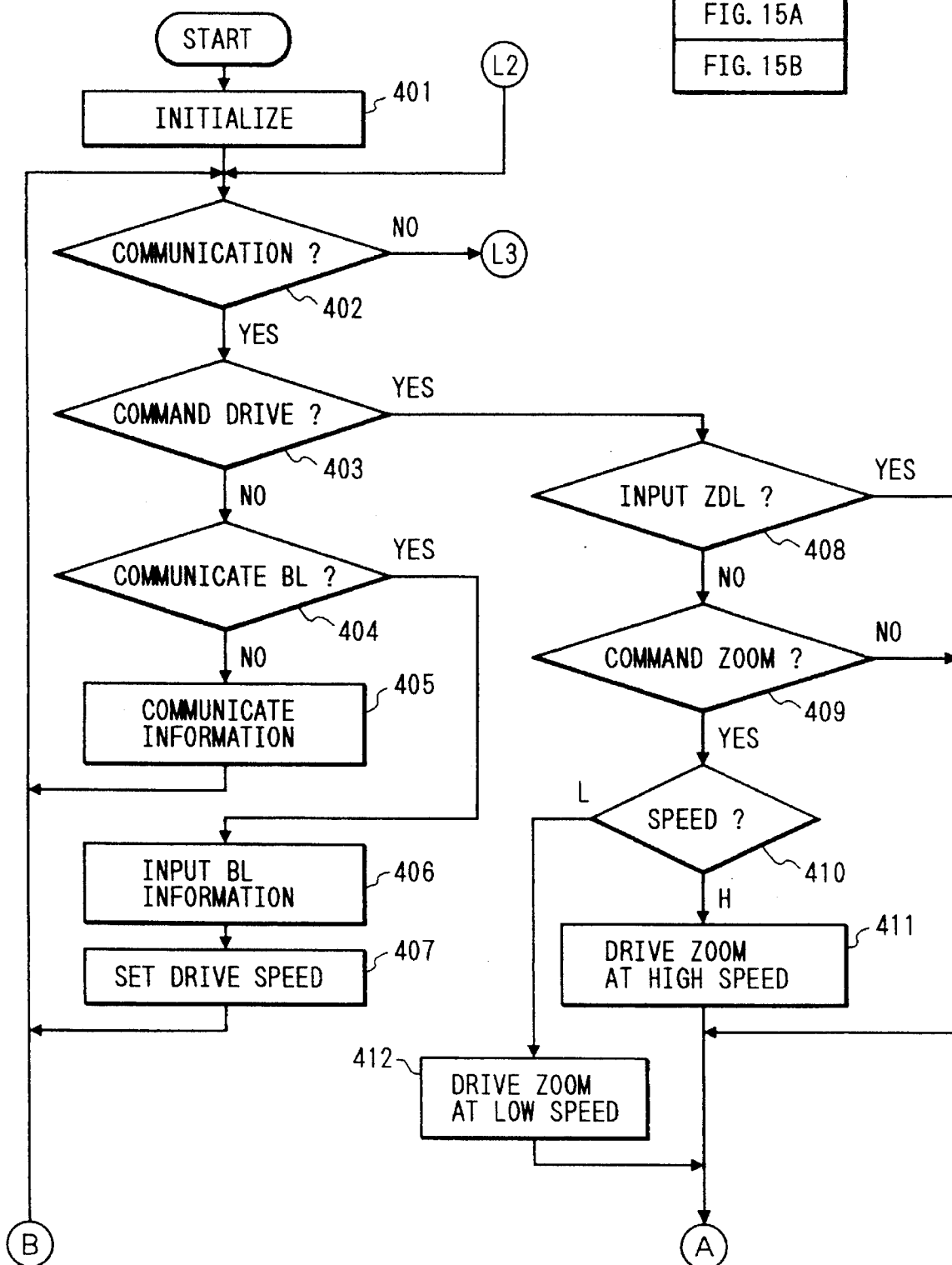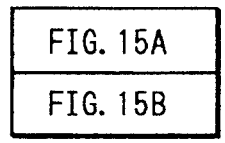

FIG. 17

| V_BAT VOLTAGE | BL LEVEL | MOTOR SPEED |
|---|---|---|
| MORE THAN 5.0V | 4 | H |
| 4.9V ∫ 4.0V | 3 | H |
| 3.9V ∫ 3.0V | 2 | L |
| 2.9V ∫ 2.5V | 1 | L |
| LESS THAN 2.4V | 0 | INHIBITION |

FIG. 18

| V_BAT VOLTAGE | BL LEVEL | MOTOR SPEED | |
| | | FOCUS | ZOOM |
|---|---|---|---|
| MORE THAN 5.0V | 4 | H | H |
| 4.9V ∫ 4.0V | 3 | H | M |
| 3.9V ∫ 3.0V | 2 | M | L |
| 2.9V ∫ 2.5V | 1 | L | L |
| LESS THAN 2.4V | 0 | INHIBITION | INHIBITION |

CAMERA ATTACHED WITH AUXILIARY DEVICE

BACKGROUND OF THE INVENTION

1. Field of the Invention

The present invention relates to an improvement in a camera system constituted by an auxiliary device such as a lens device which comprises a plurality of actuators, i.e., at least two motors (e.g., a driving motor for a focusing lens and a driving motor for a focal length adjusting lens), and a camera (main body) to which the auxiliary device such as the lens device is attached.

2. Related Background Art

In recent years, in camera systems which allow to interchange lenses, an auto-focus camera having an automatic focusing function of a photo-taking lens, and a so-called power-zoom camera or auto-zoom camera which drives a variable power optical system of a photo-taking lens by an actuator such as a motor are known. In order to further improve the function of an interchangeable lens, lenses having an image blur prevention function have been developed.

Along with such improvement of the functions of lenses, the number of actuators in a lens tends to increase, and electrical power required for such an improved-function lens inevitably increases.

However, in a conventional camera system which allows to interchange lenses, an electrical power level to be supplied from a power supply battery incorporated in a camera (main body) to a lens, and a power supply condition for determining the operation inhibition level of the remaining capacity of a battery are uniquely determined, and it is inconvenient to use lenses having different required electrical power levels while interchanging such lenses.

For example, when the electrical power level to be supplied to a lens is determined to be low irrespective of an increase in the number of actuators in a lens, the low electrical power level disturbs development of an improved-function lens including a larger number of actuators as an interchangeable lens, and the actuators in the lens cannot often be driven at a sufficient speed. Conversely, when the electrical power level is determined to be high, a wasteful electrical power loss increases when a lens which requires only a low electrical power level is attached, and the operation of the camera system is inhibited at a remaining capacity level of a battery which is determined in consideration of the high electrical power level, before the battery is fully used up, resulting in inconvenience.

SUMMARY OF THE INVENTION

One aspect of the application is to provide a camera system, which can select an optimal operation inhibition discrimination level to be compared with the remaining capacity level of a battery in correspondence with the number of actuators and a required electrical power level in an auxiliary device such as a lens device, and can prevent an electrical power loss and mismatching between a camera and an auxiliary device while an improved-function lens device including a larger number of actuators can fully exhibit its functions.

One aspect of the application is to provide a camera system which switches, in an auxiliary device (interchangeable lens), a control mode of actuators in the auxiliary device such as a lens so as to attain a required electrical power level suitable for the remaining capacity level of a battery, and can prevent an electrical power loss and mismatching between a camera and an auxiliary device while an improved-function lens device including a larger number of actuators can fully exhibit its functions.

One aspect of the application is to provide a system comprising:

a lens device comprising a plurality of actuators each corresponding to a different function of the lens device, control means for controlling the plurality of actuators, communication means for performing a communication with a camera, and storage means for storing data associated with the number of the plurality of actuators, data associated with a discrimination level at which the plurality of actuators can operate, or data associated with an electrical power level required for operating the plurality of actuators; and a camera comprising remaining capacity detection means for detecting a remaining capacity of a battery, discrimination means for comparing the detection result from the remaining capacity detection means with a designated one of a plurality of discrimination levels so as to discriminate whether or not the camera can operate, communication means for performing a communication with the lens to be attached, and discrimination level switching means for selectively switching the discrimination level to be compared with the remaining capacity of the battery in the discrimination means on the basis of the number of the plurality of actuators, the data associated with a discrimination level at which the plurality of actuators can operate, or the data associated with an electrical power level required for operating the plurality of actuators, which data is stored in the storage means, and is received via the communication means, wherein the camera selectively switches the operation inhibition discrimination level to be compared with the remaining capacity of the battery in the discrimination means on the basis of the received data of the number of actuators, the received data associated with a discrimination level at which the plurality of actuators can operate, or the received data associated with an electrical power level required for operating the plurality of actuators.

One aspect of the application is to provide a system comprising:

a camera comprising remaining capacity detection means for detecting a remaining capacity of a battery, storage means for storing the detection result of the remaining capacity detection means, and communication means for performing a communication with a lens to be attached; and a lens comprising a plurality of actuators each corresponding to a different function of the lens, control means for controlling the plurality of actuators, communication means for performing a communication with the camera, discrimination means for discriminating the remaining capacity discrimination result of the battery stored in the storage means via the communication means, and actuator number switching means for switching the number of actuators, which can be simultaneously driven by the control means, in accordance with the discrimination result of the discrimination means, or speed varying means for changing a driving speed of the actuators driven by the control means in accordance with the discrimination result of the discrimination means, wherein the lens switches the number of actuators, which can be simultaneously driven by the control means, in accordance with the discrimination result of the discrimination means for discriminating the remaining capacity detection result of the battery, or changes the driving speed of the actuators driven by the control means in accordance with the discrimination result of the discrimination means.

Other objects of the present invention will become apparent from the following description of the embodiments.

BRIEF DESCRIPTION OF THE DRAWINGS

FIG. 4 is a table showing the correspondence among the voltage value, the remaining capacity level of a battery, and the operation inhibition discrimination level in the first embodiment of the present invention;

FIG. 8 is a table associated with electrical power levels required for operating actuators in units of lenses in the third embodiment of the present invention;

FIG. 9 is a table showing the relationship among the voltage value, the remaining capacity level of a battery, and electrical power which is possible to be supplied to a lens in the third embodiment of the present invention;

FIG. 10 is a table associated with electrical power levels required for operating actuators in units of lenses in the fourth embodiment of the present invention;

FIG. 12 is a table showing the relationship among the voltage value, the remaining capacity level of a battery, and motor control in a lens in the fifth embodiment of the present invention;

FIG. 17 is a table showing the relationship among the voltage value, the remaining capacity level of a battery, and motor control in the lens in the sixth embodiment of the present invention; and FIG. 18 is a table showing the relationship among the voltage value, the remaining capacity level of a battery, and motor control in a lens in the seventh embodiment of the present invention.

DETAILED DESCRIPTION OF THE PREFERRED EMBODIMENTS

The present invention will be described in detail hereinafter with reference to the illustrated embodiments.

Figure 1:
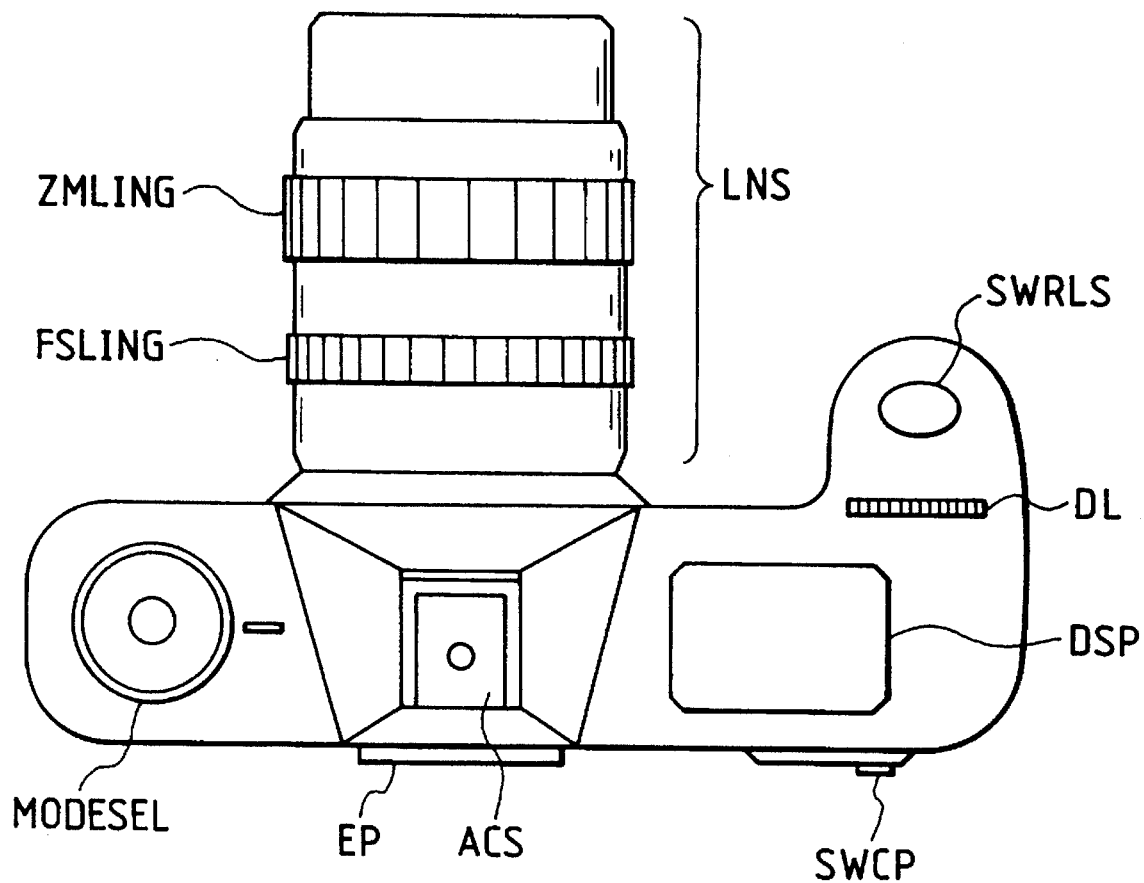
FIG. 1 is a top view of a camera according to the first embodiment of the present invention.

FIG. 1 is a top view of a camera system which allows to interchange lenses according to the first embodiment of the present invention.

(First Embodiment)

Referring to FIG. 1, a photo-taking lens (to be simply referred to a "lens" hereinafter) LNS has a zoom optical system. The lens LNS has an operation member ZMLNG serving as input means for instructing driving of zoom optical system driving means, and an operation member FSLNG used in manual focusing.

A camera (main body) is provided with various operation members such as a shutter button SWRLS, a rotary dial DL used for setting various kinds of information such as a shutter speed, an iris value, and the like, a switch SWCP used when an exposure correction value is set or when an iris value is manually set, and a dial MODESEL for selecting an operation mode of the camera. The camera also has a display DSP comprising a liquid crystal panel, an eyepiece EP, and an accessory shoe ACS.

Figure 2:
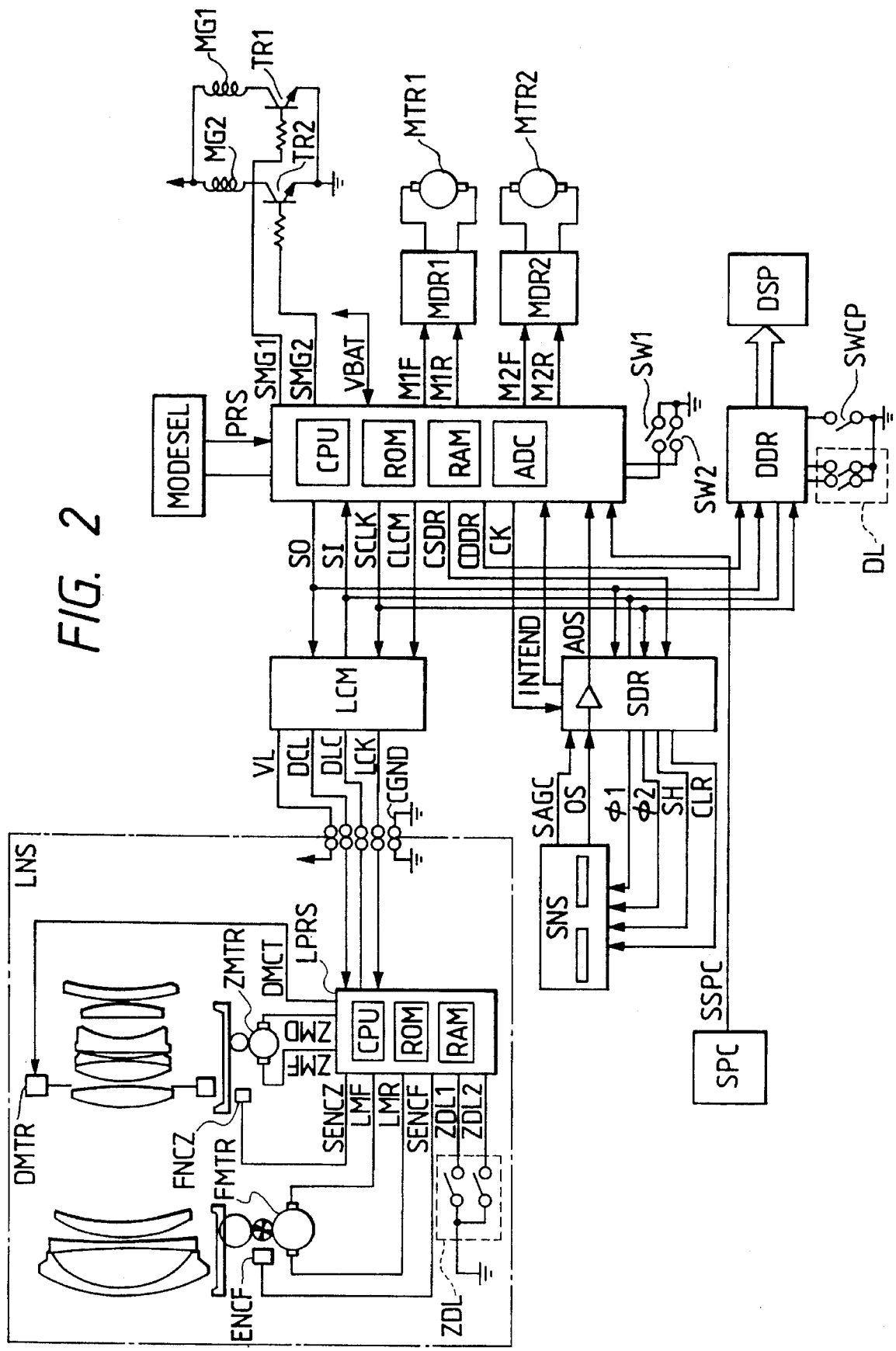
FIG. 2 is a block diagram showing the circuit arrangement of the camera shown in FIG. 1.

FIG. 2 is a block diagram showing the circuit arrangement of the camera and the lens LNS in the above-mentioned arrangement.

Referring to FIG. 2, a microcomputer PRS controls the entire camera, and includes a processor core, a ROM, a RAM, an A/D converter, and the like. A display driver DDR performs display control of a display DSP (which is the same as the display shown in FIG. 1), and detects switch inputs.

Switches which supply signals to the display driver DDR include the rotary dial DL and the switch SWCP (FIG. 1) used when an exposure correction value is set or when an iris value is manually set. The dial DL supplies 2-bit data to the driver DDR since it comprises an encoder for outputting 2-phase pulses having a 90° phase difference therebetween when the dial DL is rotated.

A photomerry sensor SPC is used for measuring the object luminance for exposure control. A distance measurement (focus detection) sensor SNS comprises two line sensor arrays, and is used for detecting the defocus amount. A sensor driver SDR performs accumulation control of the distance measurement (focus detection sensor) SNS, and serves as a signal read-out interface thereof. A lens interface LCM serves as an interface when the microcomputer PRS communicates with the lens LNS.

The dial MODESEL is an operation member for selecting the operation mode of the camera shown in FIG. 1. Switches SW1 and SW2 are respectively turned on at the first and second stroke positions of the shutter button SWRLS shown in FIG. 1.

Transistors TR1 and TR2 respectively perform energization control of magnets MG1 and MG2 for respectively controlling forward and rearward shutters of a shutter. A motor MTR1 is used for winding and rewinding a film. A motor MTR2 is used for charging the shutter, and moving a mirror upward or downward. These motors MTR1 and MTR2 are respectively driven by motor drivers MDR1 and MDR2.

The microcomputer PRS exchanges information with the respective devices via the display driver DDR, the sensor driver SDR, and the lens interface LCM by serial communications.

A data signal SO is output from the microcomputer PRS to the respective devices. Data signals SI are output from the respective devices to the microcomputer PRS. A synchronization clock signal SCLK is output from the microcomputer PRS to the respective devices. The microcomputer PRS exchanges information with the respective devices using these signals SO, SI, and SCLK. In this case, the microcomputer outputs a signal CDDR as a chip select signal when it communicates with the display driver DDR; outputs a signal CSDR as a chip select signal when it communicates with the sensor driver SDR; and outputs a signal CLCM as a chip select signal when it communicates with the lens interface LCM. Upon execution of shutter control, the microcomputer PRS outputs signals SMG1 and SMG2 to execute energization control of the transistors TR1 and TR2. Upon execution of film feed control, the microcomputer PRS outputs signals M1F and M1R to the motor MTR1. Upon execution of a shutter charging operation or a mirror up/down operation, the microcomputer PRS outputs signals M2F and M2R to the motor MTR2. The microcomputer PRS is connected to a battery voltage VBAT, and can detect the voltage level of a battery by A/D converting the voltage VBAT, as needed.

The lens interface LCM comprises the following signal lines connected to the lens LNS: a power supply line VL for supplying a power supply voltage to the lens LNS, a communication data line DCL for supplying data from the camera to the lens LNS, a communication data line DLC for supplying data from the lens LNS to the camera, a communication synchronization clock line LCK for supplying a synchronization clock signal to the lens LNS, and a ground line CGND.

The sensor driver SDR supplies read control clocks φ1 and φ2 for an image signal, a hold signal SH for the image signal, and a reset signal CLR for the distance measurement (focus detection) sensor SNS. On the other hand, the distance measurement (focus detection) sensor SNS supplies a signal SAGC for monitoring the object luminance and an image signal OS to the sensor driver SDR.

The microcomputer PRS supplies, to the sensor driver SDR, a clock signal CK for defining the timings for generating the signals φ1 and φ2 when the image signal OS is read out. The sensor driver SDR supplies a signal INTEND indicating the end of accumulation, and an image signal AOS obtained by amplifying the image signal OS with a predetermined gain in the sensor driver SDR to the microcomputer PRS.

The circuit arrangement in the lens LNS will be described below.

A microcomputer LPRS performs motor control in the lens LNS, and stores optical information inherent to the lens LNS. The microcomputer LPRS includes a processor core, a ROM, a RAM, and the like.

Switches ZDL1 and ZDL2 connected to the microcomputer LPRS constitute an encoder for outputting 2-phase pulses having a 90° phase difference therebetween upon rotation of the operation member ZMLNG shown in FIG. 1. The zoom driving amount is determined in accordance with the number of input pulses from the encoder.

A focus lens driving motor FMTR is driven by signals LMF and LMR. An encoder ENCF detects the driving amount of a focus lens, and its output signal SENCF is input to the microcomputer LPRS. A zoom lens driving motor ZMTR is driven by signals ZMF and ZMR. An iris driving motor DMTR is driven by a signal DMCT.

The operation of the microcomputer PRS in the camera (main body) will be described below with reference to the flow chart in FIG. 3.

Figure 3:
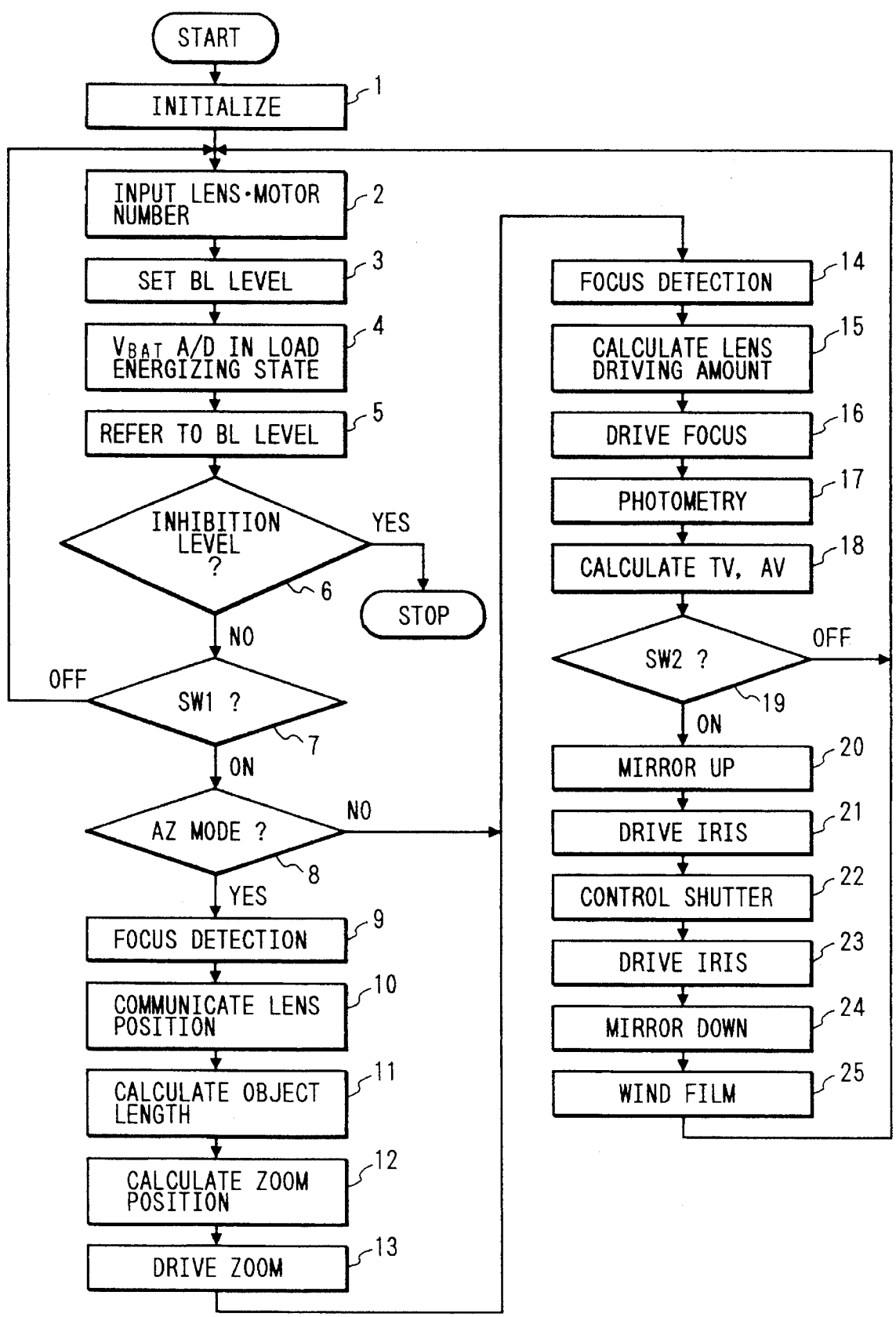
FIG. 3 is a flow chart showing the operation of a microcomputer in the camera shown in FIG. 1.

When a power switch (not shown) is turned on, and the microcomputer PRS is enabled, the microcomputer PRS starts its operation from step 1 in FIG. 3.

[Step 1] The microcomputer PRS initializes its own ports, memories, and the like, and the flow advances to step 2.

[Step 2] The microcomputer PRS communicates with the microcomputer LPRS in the lens (to be also referred to as a lens microcomputer LPRS hereinafter) via the lens interface LCM to acquire information stored in the lens microcomputer LPRS, and associated with the number of motors (to be referred to as a motor number hereinafter) in the lens LNS. The operation of the lens microcomputer LPRS will be described later. In this embodiment, since the motor number in the lens LNS is 3 (the focus lens driving motor FMTR, the zoom lens driving motor ZMTR, and the iris driving motor DMTR), the microcomputer PRS acquires this information. The flow then advances to step 3.

[Step 3] The microprocessor PRS sets the operation inhibition level based on the predetermined information associated with the motor number in the lens LNS and the remaining capacity level of the battery in accordance with the information associated with the motor number in the lens LNS acquired in step 2.

FIG. 4 is an example of a table showing the correspondence between the information associated with the motor number in the lens LNS and the operation inhibition level based on the remaining capacity level of the battery. The remaining capacity level (to be referred to as a BL level hereinafter, as needed, for the sake of simplicity) is determined, in advance, on the basis of a battery voltage $V_{BAT}$ (V: volts) obtained by A/D conversion in step 4 (to be described later). This table is used to determine the operation inhibition level based on the information associated with the motor number in the currently attached lens LNS.

In this table, if the battery voltage $V_{BAT}$ obtained by A/D conversion is equal to or higher than "5 V", the remaining capacity level of the battery is determined to be "BL level 4"; if the battery voltage $V_{BAT}$ is equal to or higher than "4 V" and equal to or lower than "4.9 V", the remaining capacity level is determined to be "BL level 3"; if the battery voltage $V_{BAT}$ is equal to or higher than "3 V" and equal to or lower than "3.9 V", the remaining capacity level is determined to be "BL level 2"; if the battery voltage $V_{BAT}$ is equal to or higher than "2.5 V" and equal to or lower than "2.9 V", the remaining capacity level is determined to be "BL level 1"; and if the battery voltage $V_{BAT}$ is equal to or lower than "2.4 V", the remaining capacity level is determined to be "BL level 0".

In correspondence with these BL levels, when the motor number in the lens LNS is 1, the motor can operate up to a battery of "BL level 1", and its operation is inhibited for a battery of "BL level 0". When the motor number in the lens LNS is 2, the motors can operate up to a battery of "BL level 2", and their operations are inhibited for a battery of "BL level 1". When the motor number in the lens LNS is 3, the motors can operate up to a battery of "BL level 3", and their operations are inhibited for a battery of "BL level 2".

Note that such a table is written in advance in the ROM of the microcomputer PRS in the camera. In this embodiment, since the motor number in the lens LNS is 3, the motors can operate up to "BL level 3", and their operations are inhibited for a battery of "BL level 2" or lower.

[Step 4] The microcomputer PRS A/D-converts the battery voltage $V_{BAT}$ while energizing proper actuators in the camera, e.g., the shutter magnets MG1 and MG2 as loads so as to acquire a voltage value corresponding to the remaining capacity level. Thereafter, the flow advances to step 5.

[Step 5] The operation inhibition level set in step 3 is compared with the remaining capacity level of the battery acquired in step 4.

[Step 6] The microcomputer PRS checks based on the comparison result in step 5 if the current remaining capacity level of the battery allows the operations of the motors. In this embodiment, the operations of the motors are inhibited for a battery of "BL level 2" or lower. If this state is detected, the microcomputer PRS stops its operation. If the battery has "BL level 3" or higher, the flow advances to step 7.

[Step 7] The microcomputer PRS checks the state of the switch SW1 which is turned on at the first stroke position of the shutter button SWRLS so as to check if the switch SW1 is ON. If the switch SW1 is OFF, the flow returns to step 2 to repeat the above-mentioned steps. However, if the switch SW1 is ON, the flow advances to step 8.

[Step 8] The microcomputer PRS checks the state of the dial MODESEL for selecting the operation mode of the camera so as to check if an auto-zoom mode is selected. If YES in step 8, the flow advances to step 9.

[Step 9] The microcomputer PRS supplies a control signal to the sensor driver SDR to perform accumulation control of the distance measurement (focus detection) sensor SNS so as to acquire an image signal. Furthermore, the microcomputer PRS performs a correlation calculation based on the acquired image signal to obtain the current focus shift amount, i.e., a so-called defocus amount. The flow then advances to step 10.

[Step 10] The microcomputer PRS communicates with the lens microcomputer LPRS via the lens interface LCM to acquire the current extension amount of a distance ring. The flow advances to step 11.

[Step 11] The microcomputer PRS calculates the distance to an object on the basis of the defocus amount to the object acquired in step 9, and the current extension amount with reference to an infinity position of the lens LNS acquired in step 10. Thereafter, the flow advances to step 12.

In the case of the entire extension lens LNS, for example, if the defocus amount is represented by D, the current extension amount is represented by X, and the focal length is represented by f, a photo-taking magnification β is given by:

$$\beta = (X-D)/f$$

Furthermore, a photo-taking distance Obj to an object is given by:

$$Obj = (f/\beta) - f - f(1-\beta)$$

Note that the above equation is an approximation obtained when the principal point interval of the lens LNS is set to be 0.

[Step 12] The microcomputer PRS calculates a focal length which is expected to attain an optimal photo-taking magnification on the basis of the photo-taking distance Obj to an object calculated in step 11, and the flow then advances to step 13.

As a detailed method of calculating the focal length which is expected to attain an optimal photo-taking magnification, a technique for determining the focal length, so that a person image has a suitable size upon taking, e.g., a portrait, is used. However, since such a technique has already been proposed, and is not related to the gist of the-present invention, a detailed description thereof will be omitted.

[Step 13] The microcomputer PRS communicates with the lens microcomputer LPRS via the lens interface LCM to instruct driving of the zoom lens LNS, so as to attain the focal length calculated in step 12. Thus, an auto-zoom operation is performed. Thereafter, the flow advances to step 14.

[Step 14] The microcomputer PRS supplies a control signal to the sensor driver SDR to perform accumulation control of the distance measurement (focus detection) sensor SNS so as to acquire an image signal. Furthermore, the microcomputer PRS performs a correlation calculation based on the acquired image signal to obtain the current focus shift amount, i.e., a so-called defocus amount. If the auto-zoom operation is performed, re-distance measurement (re-focus detection) is performed in this state after the zoom operation. However, if the state of the dial MODESEL does not indicate the auto-zoom mode, the flow jumps from step 8 to this step, and distance measurement (focus detection) is performed for the first time.

[Step 15] The microcomputer PRS calculates a driving amount of the focus lens on the basis of the defocus amount calculated in step 14 so as to attain an in-focus state.

In order to calculate the driving amount of the focus lens, parameters inherent to the lens such as the rate of change in defocus amount upon movement of the focus lens by a unit moving amount are required. In this case, assume that the microcomputer PRS obtains such data as needed via a communication with the lens microcomputer LPRS.

[Step 16] The microcomputer PRS transmits the lens driving amount calculated in step 15 to the lens microcomputer LPRS via the lens interface LCM to instruct driving of the focus lens. Thus, an auto-focus operation is performed. Thereafter, the flow advances to step 17.

[Step 17] The microcomputer PRS A/D-converts the outputs from the photomerry sensor SPC for exposure control so as to acquire object luminance information. Thereafter, the flow advances to step 18.

[Step 18] The microcomputer PRS determines a shutter speed Tv and an iris value Av on the basis of the object luminance information acquired in step 17 so as to attain proper exposure. The flow then advances to step 19.

[Step 19] The microcomputer PRS checks the state of the switch SW2 which is turned on at the second stroke position of the shutter button SWRLS to check if the switch SW2 is ON. If the switch SW2 is OFF, the flow returns to step 2 to repeat the above-mentioned steps. However, if the switch SW2 is ON, the flow advances to step 20.

[Step 20] The microcomputer PRS outputs the signals M2F and M2R to drive the motor MTR2, thereby moving the mirror upward. Then, the flow advances to step 21.

[Step 21] The microcomputer PRS transmits the iris value Av determined in step 18 to the lens microcomputer LPRS via the lens interface LCM to instruct driving of an iris. Thus, the iris is stopped down. Thereafter, the flow advances to step 22.

[Step 22] The microcomputer PRS outputs the signals SMG1 and SMG2 to perform energization control of the transistors TR1 and TR2, thereby driving the shutter. Thus, exposure is performed. Thereafter, the flow advances to step 23.

[Step 23] The microcomputer PRS communicates with the lens microcomputer LPRS via the lens interface LCM to instruct opening of the iris. Thus, the iris is opened. Thereafter, the flow advances to step 24.

[Step 24] The microcomputer PRS outputs the signals M2F and M2R to drive the motor MTR2, thereby moving the mirror downward. Thereafter, the flow advances to step 25.

[Step 25] The microcomputer PRS outputs the signals M1F and M1R to drive the motor MTR1, thereby winding up a film.

Since a photo-taking sequence is completed, as described above, the flow returns to step 2 to repeat the above-mentioned flow.

The operation of the lens microcomputer LPRS will be described below with reference to the flow chart in FIGS. 5A and 5B.

Figure 5B:
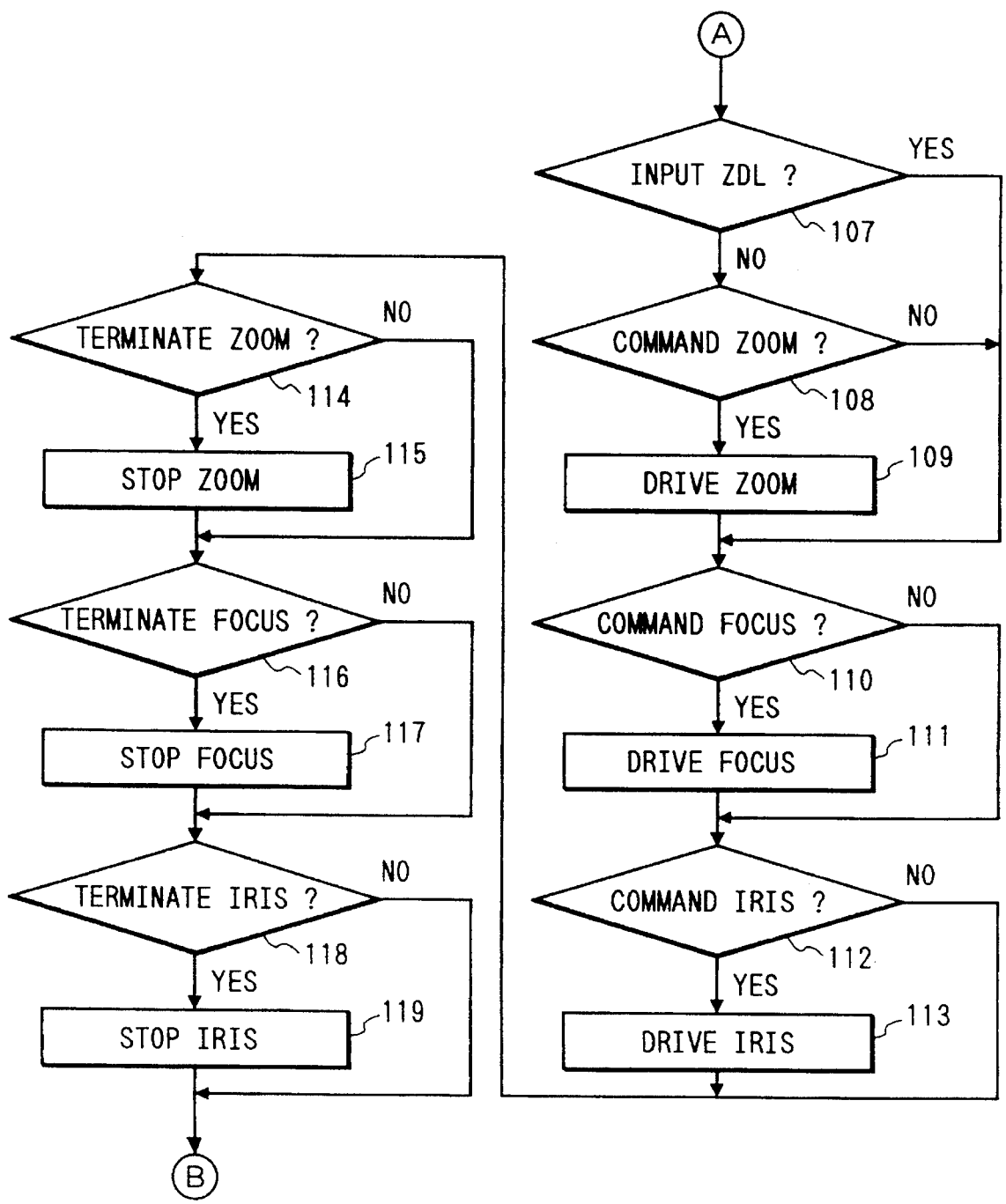
FIG. 5 which is comprised of FIGS. 5A and 5B is a flow chart showing the operation of a microcomputer in a lens shown in FIG. 1.

When the lens LNS is attached to the camera, and the lens microcomputer LPRS is enabled by electrical power supplied from the camera, the lens microcomputer LPRS starts its operation from step 101 in FIGS. 5A and 5B.

[Step 101] The microcomputer LPRS initializes its own ports, memories, and the like, and the flow advances to step 102.

[Step 102] The microcomputer LPRS checks if a communication from the microcomputer PRS in the camera (to be also referred to as a camera microcomputer PRS hereinafter) is detected. If YES in step 102, the flow advances to step 103.

[Step 103] The microcomputer LPRS checks if the communication contents from the camera microcomputer PRS include a command for driving the motor in the lens. If NO in step 103, the flow advances to step 104.

[Step 104] The microcomputer LPRS checks if the communication contents from the camera microcomputer PRS include an output request of information of the motor number in the lens. If NO in step 104, the flow advances to step 105.

[Step 105] If the current communication contents from the camera microcomputer PRS include neither the driving command nor the transmission request of information of the motor number, the camera microcomputer PRS may be requesting output of data inherent to the lens LNS so as to perform exposure control or the auto-focus operation. Thus, the microcomputer LPRS performs a communication corresponding to such a request. Thereafter, the flow returns to step 102 to repeat the above-mentioned steps.

If it is determined in step 104 that the communication contents from the camera microcomputer PRS include a transmission request of information of the motor number, the flow jumps from step 104 to step 106.

[Step 106] The microcomputer LPRS outputs information of the motor number in the lens stored in its internal memory to the camera microcomputer PRS. The flow then returns to step 102.

Thereafter, upon reception of the driving command in step 103, the flow branches from step 103 to step 107.

[Step 107] The microcomputer LPRS checks if the operation member ZMLNG is operated, and signal pulses are input from the switches ZDL1 and ZDL2. If NO in step 107, the flow advances to step 108.

[Step 108] The microcomputer LPRS checks if the driving command transmitted from the camera microcomputer PRS is a command for driving the zoom motor. If YES in step 108, the flow advances to step 109.

[Step 109] The microcomputer LPRS starts driving of the zoom motor in accordance with the driving command transmitted from the camera microcomputer PRS. The flow then advances to step 110.

If it is determined in step 107 that the operation member ZMLNG is operated, and signal pulses are input from the switches ZDL1 and ZDL2, the flow jumps from step 107 to step 110 without executing steps 108 and 109 so as to preferentially perform a manual zoom operation. Also, if it is determined in step 108 that the driving command transmitted from the camera microcomputer PRS is not a command for driving the zoom motor, the flow jumps from step 108 to step 110.

[Step 110] The microcomputer LPRS checks if the driving command transmitted from the camera microcomputer PRS is a command for driving the focus motor. If YES in step 110, the flow advances to step 111.

[Step 111] The microcomputer LPRS starts driving of the focus motor in accordance with the driving command transmitted from the camera microcomputer PRS. The flow then advances to step 112.

[Step 112] The microcomputer LPRS checks if the driving command transmitted from the camera microcomputer PRS is a command for driving the iris driving motor. If YES in step 112, the flow advances to step 113.

[Step 113] The microcomputer LPRS starts driving of the iris driving motor in accordance with the driving command transmitted from the camera microcomputer PRS. The flow then advances to step 114.

If it is determined in step 112 that the driving command transmitted from the camera microcomputer PRS is not a command for driving the iris driving motor, the flow jumps from step 112 to step 114.

[Step 114] The microcomputer LPRS checks if the driving amount of the zoom motor which was started in step 109 reaches a predetermined amount. If YES in step 114, the flow advances to step 115.

[Step 115] The microcomputer LPRS ends the driving operation of the zoom motor, and the flow advances to step 116.

If it is determined in step 114 that the driving amount of the zoom motor does not reach the predetermined amount, the flow jumps to step 116 without executing step 115.

[Step 116] The microcomputer LPRS checks if the driving amount of the focus motor which was started in step 111 reaches a predetermined amount. If YES in step 116, the flow advances to step 117.

[Step 117] The microcomputer LPRS ends the driving operation of the focus motor, and the flow advances to step 118.

If it is determined in step 116 that the driving amount of the focus motor does not reach the predetermined amount, the flow jumps to step 118 without executing step 117.

[Step 118] The microcomputer LPRS checks if the driving amount of the iris driving motor which was started in step 113 reaches a predetermined amount. If YES in step 118, the flow advances to step 119.

[Step 119] The microcomputer LPRS ends the driving operation of the iris driving motor, and the flow returns to step 102.

On the other hand, if it is determined in step 118 that the driving amount of the iris driving motor does not reach the predetermined amount, the flow returns from step 118 to step 102.

If it is determined in step 102 that a communication from the camera microcomputer PRS is not detected, the flow advances from step 102 to step 120.

[Step 120] The microcomputer LPRS checks if the operation member ZMLNG is operated, and signal pulses are input from the switches ZDL1 and ZDL2. If YES in step 120, the flow advances to step 121 to execute a manual zoom operation.

[Step 121] The microcomputer LPRS calculates a driving amount of the zoom motor on the basis of the number of signal pulses from the switches ZDL1 and ZDL2 upon operation of the operation member ZMLNG. The flow then advances to step 122.

[Step 122] The microcomputer LPRS starts the driving operation of the zoom motor in accordance with the driving amount calculated in step 121. The flow then advances to step 123.

[Step 123] The microcomputer LPRS calculates a focus moving amount due to the movement of a variable power optical system upon driving of the zoom motor, and calculates a driving amount of the focus lens LNS to compensate for the focus moving amount. Thereafter, the flow advances to step 124.

[Step 124] The microcomputer LPRS starts the driving operation of the focus motor in accordance with the driving amount of the focus lens calculated in step 123, and the flow advances to step 125.

[Step 125] The microcomputer LPRS checks if the driving amount of the zoom motor, which was started in step 122, reaches a predetermined amount. If YES in step 125, the flow advances to step 126.

[Step 126] The microcomputer LPRS ends the driving operation of the zoom motor, and the flow advances to step 127.

If it is determined in step 125 that the driving amount of the zoom motor does not reach a predetermined amount, the flow also branches from step 125 to step 127.

[Step 127] The microcomputer LPRS checks if the driving amount of the focus motor, which was started in step 124, reaches a predetermined amount. If YES in step 127, the flow advances to step 128.

[Step 128] The microcomputer LPRS ends the driving operation of the focus motor, and the flow returns to step 102.

If it is determined in step 127 that the driving amount of the focus motor does not reach a predetermined amount, or if it is determined in step 120 that the operation member ZMLNG is not operated, and signal pulses are not input from the switches ZDL1 and ZDL2, the flow returns from the corresponding step to step 102.

The operation of the lens microcomputer LPRS has been described.

(Second Embodiment)

In the first embodiment described above, in a combination of a camera and a lens, the camera comprises detection means for detecting the remaining capacity of a battery, discrimination means for comparing the detection result of the detection means with a discrimination level to discriminate whether or not the camera can operate, and communication means with the lens, and the lens LNS comprises a plurality of actuators each corresponding to a different function of the lens, control means for controlling the plurality of actuators, communication means with the camera, and means for storing data associated with the number of the plurality of actuators. The camera receives the stored data associated with the number of actuators from the lens via the communication means, and selectively switches the discrimination level to be compared with the remaining capacity of the battery in the discrimination means on the basis of the received data. However, individual actuators in the lens LNS require various electrical power levels, and it is often difficult to selectively switch to an optimal discrimination level to be compared with the remaining capacity of the battery in accordance with only the number of actuators in the lens LNS. The second embodiment which is achieved in consideration of this situation will be described below.

Since the top view of the camera system of the second embodiment is the same as that in FIG. 1, and the electrical circuit arrangement of the camera and lens is the same as that shown in FIG. 2, a detailed description thereof will be omitted. Since the operations of the camera and lens microcomputers PRS and LPRS are substantially the same as those in the first embodiment, except for some steps, only different steps will be explained below.

Figure 6:
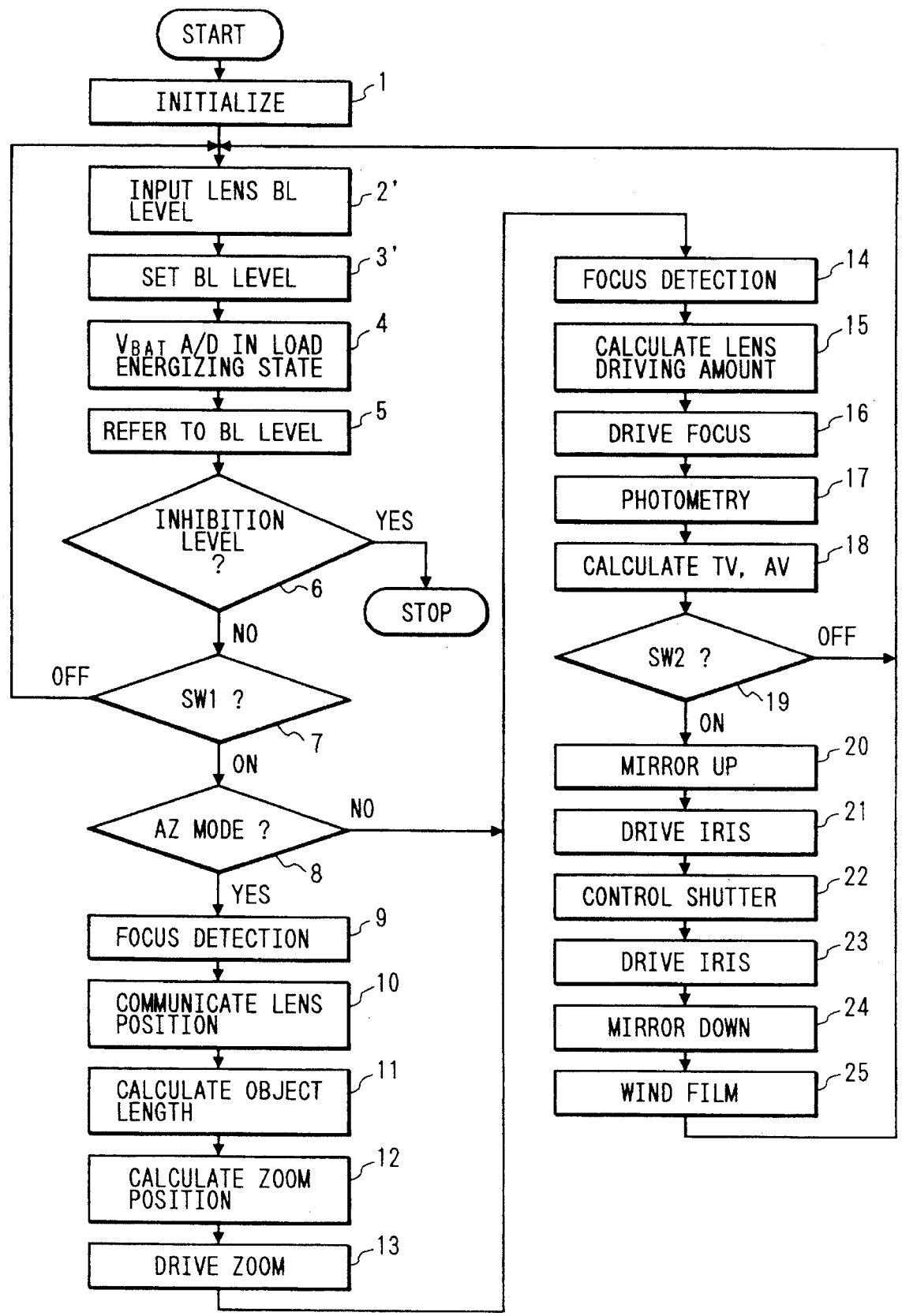
FIG. 6 is a flow chart showing the operation of a microcomputer in a camera according to the second embodiment of the present invention.

FIG. 6 is a flow chart showing the operation of the camera microcomputer PRS according to the second embodiment of the present invention. In FIG. 6, steps different from those in the operation of the camera microcomputer PRS in the first embodiment are only steps 2' and 3'.

[Step 2'] The microcomputer PRS communicates with the lens microcomputer LPRS via the lens interface LCM to acquire information associated with the BL level of the lens LNS, which information is stored in the lens microcomputer LPRS.

For example, if it is determined based on the motor number in the lens and their required electrical power levels that the motors can operate up to "BL level 2", the microcomputer PRS acquires this information. The flow then advances to step 3'.

[Step 3'] The microcomputer PRS sets the operation inhibition level in accordance with the information associated with the BL level from the lens LNS, which information is acquired in step 2'.

Although FIG. 4 has already been described above, a possible operation level optimized in units of lenses can be set directly in the form of the BL level in place of the motor number in this embodiment. For example, it is set in step 2' that an operation can be performed up to a battery of "BL level 2", and is inhibited for a battery of "BL level 1" or lower.

Thereafter, the operations in step 4 and subsequent steps are performed.

The difference between the operation of the camera microcomputer PRS of this embodiment and that in the first embodiment has been described.

Figure 7B:
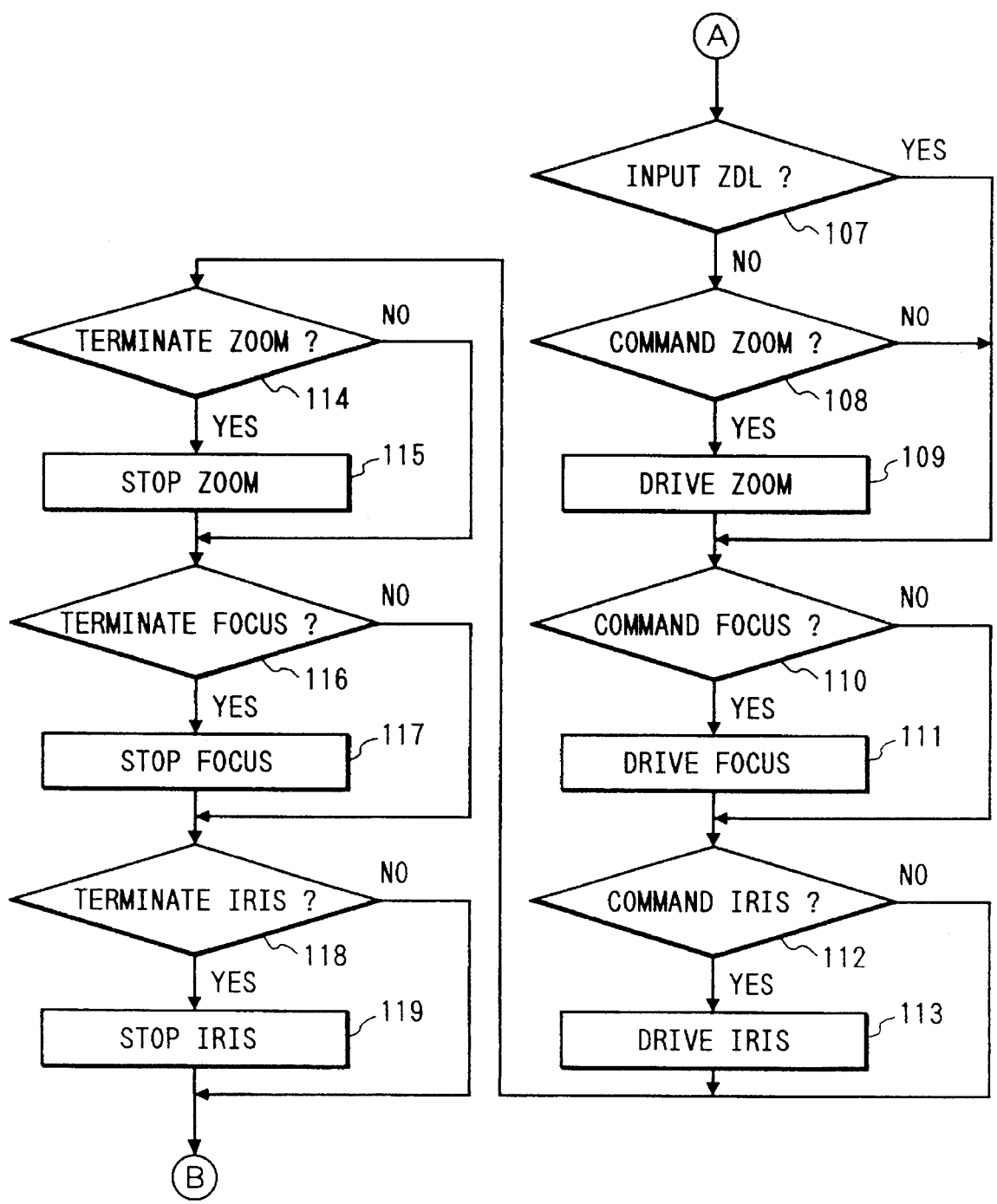
FIG. 7 which is comprised of FIGS. 7A and 7B is a flow chart showing the operation of a microcomputer in a lens according to the second embodiment of the present invention.

The operation of the lens microcomputer LPRS of the second embodiment will be described below with reference to the flow chart in FIGS. 7A and 7B. Only steps 104' to 106' as different steps from the flow chart in FIG. 4 of the first embodiment will be described below.

[Step 104'] The microcomputer LPRS checks if the communication contents from the camera microcomputer PRS include an output request of information associated with the BL level of the lens LNS, which information is stored in the lens microcomputer LPRS. If NO in step 104', the flow advances to step 105'.

[Step 105'] If the current communication contents from the camera microcomputer PRS include neither the driving command nor the transmission request of information associated with the BL level of the lens LNS, the camera microcomputer PRS may be requesting output of data inherent to the lens so as to perform exposure control or the auto-focus operation. Thus, the lens microcomputer LPRS performs a communication corresponding to such a request. Thereafter, the flow returns to step 102 to repeat the above-mentioned steps.

If it is determined in step 104' that the communication contents from the camera microcomputer PRS include a transmission request of information associated with the BL level of the lens LNS, the flow jumps from step 104' to step 106'.

[Step 106'] The microcomputer LPRS outputs information associated with the BL level of the lens LNS, which information is stored in advance in its internal memory, to the camera microcomputer PRS. The flow then returns to step 102.

The difference between the operation of the lens microcomputer LPRS of this embodiment and that in the first embodiment has been described.

(Third Embodiment)

In addition to the methods of the first and second embodiments described above, in order to set a possible operation level which is optimized with respect to the types or required electrical power levels of actuators in each lens between the camera and the lens LNS, the lens LNS may transmit information associated with the required electrical power levels of actuators in the lens LNS, which information is stored in the lens microcomputer LPRS, to the camera, and the camera may set a possible operation level by comparing an electrical power level which can be supplied to the lens LNS, and is determined in advance in units of BL levels, with the received information. This method will be described below as the third embodiment of the present invention.

Since the top view of the camera system of the third embodiment is the same as that in FIG. 1, and the electrical circuit arrangement of the camera and lens is the same as that shown in FIG. 2, a detailed description thereof will be omitted.

FIG. 8 shows an example of information associated with required electrical power levels of actuators in the lens LNS stored in the lens microcomputer LPRS according to the third embodiment of the present invention.

A lens LNS with a lens name "A" has a focus motor and an iris driving motor, and stores information indicating that the focus motor requires electrical power of 1 W, and the iris driving motor requires electrical power of 0.5 W, in the internal ROM of its lens microcomputer LPRS. This information is transmitted to the camera.

A lens LNS with a lens name "B" has a focus motor, an iris driving motor, and a zoom motor, and stores information indicating that the focus motor requires electrical power of 1 W, the iris driving motor requires electrical power of 0.5 W, and the zoom motor requires electrical power of 1 W, in the internal ROM of its lens microcomputer LPRS. This information is transmitted to the camera.

A lens LNS with a lens name "C" has a focus motor, an iris driving motor, a zoom motor, and an image blur prevention control motor, and stores information indicating that the focus motor requires electrical power of 1 W, the iris driving motor requires electrical power of 0.5 W, the zoom motor requires electrical power of 0.5 W, and the image blur prevention control motor requires electrical power of 0.5 W, in the internal ROM of its lens microcomputer LPRS. This information is transmitted to the camera.

Upon reception of such information, the camera sets a possible operation level in correspondence with a table of electrical power levels which can be supplied to the lens LNS, and are determined in units of BL levels, as shown in FIG. 9.

FIG. 9 is a table showing the correspondence between BL levels and electrical power levels which can be supplied to the lens LNS, which table is stored in advance in the camera microcomputer PRS.

In this embodiment, the camera microcomputer PRS is assumed to store the following table. That is, if the battery has "BL level 4", electrical power which can be supplied to the lens LNS is up to 3 W; if the battery has "BL level 3", electrical power which can be supplied to the lens LNS is up to 2 W; if the battery has "BL level 2", electrical power which can be supplied to the lens LNS is up to 1.5 W; and if the battery has "BL level 1", electrical power which can be supplied to the lens LNS is up to 1 W.

For example, if the lens "C" in FIG. 8 is attached, since power of 3 W is required for the total electrical power of the motors to fully exhibit the function of the lens "C", the camera microcomputer PRS can set a possible operation level, so that an operation is allowed at "BL level 4", and is inhibited at "BL level 3" or less.

(Fourth Embodiment)

As a modification of the third embodiment, when required electrical power levels can be lowered by executing speed control of the actuators in the lens LNS, information stored in the lens microcomputer LPRS and associated with required electrical power levels of the actuators in the lens LNS, as shown in FIG. 10, may be transmitted to the camera. This modification will be described below as the fourth embodiment of the present invention.

Since the top view of the camera system of the fourth embodiment is the same as that in FIG. 1, and the electrical circuit arrangement of the camera and lens is the same as that shown in FIG. 2, a detailed description thereof will be omitted.

FIG. 10 shows an example of information associated with required electrical power levels of the actuators in the lens, which information is stored in the lens microcomputer LPRS according to the fourth embodiment of the present invention. In the columns of the focus motor and the zoom motor, required electrical power levels at high speed and those at low speed are separately listed.

A lens LNS with a lens name "A" has a focus motor and an iris driving motor, and stores information indicating that the focus motor requires electrical power of 1 W at high speed and electrical power of 0.5 W at low speed, and the iris driving motor requires electrical power of 0.5 W, in the internal ROM of its lens microcomputer LPRS. This information is transmitted to the camera.

A lens LNS with a lens name "B" has a focus motor, an iris driving motor, and a zoom motor, and stores information indicating that the focus motor requires electrical power of 1 W at high speed and electrical power of 0.5 W at low speed, the iris driving motor requires electrical power of 0.5 W, and the zoom motor requires electrical power of 1 W at high speed and electrical power of 0.5 W at low speed, in the internal ROM of its lens microcomputer LPRS. This information is transmitted to the camera.

A lens LNS with a lens name "C" has a focus motor, an iris driving motor, a zoom motor, and an image blur prevention control motor, and stores information indicating that the focus motor requires electrical power of 1 W at high speed and electrical power of 0.5 W at low speed, the iris driving motor requires electrical power of 0.5 W, the zoom motor requires electrical power of 1 W at high speed and electrical power of 0.5 W at low speed, and the image blur prevention control motor requires electrical power of 0.5 W, in the internal ROM of its lens microcomputer LPRS. This information is transmitted to the camera.

Upon reception of such information, the camera sets a possible operation level in correspondence with a table of electrical power levels which can be supplied to the lens LNS and are determined in advance in units of BL levels, as shown in FIG. 9, as in the third embodiment. In addition, the camera issues a command for setting the driving speed of the focus motor and the zoom motor at high or low speed to the lens LNS as needed. Thus, an optimized possible operation level can be set.

Note that the present invention is not limited to the lens which mounts three different motors, i.e., the zoom motor, focus motor, and iris driving motor described in each of the above embodiments. For example, the present invention may be applied to various other lenses such as a lens having an actuator for driving an image blur prevention function, a lens having a variable aberration actuator, a lens having an actuator for driving a tilt or shift function, and the like.

(Fifth Embodiment)

Figure 11:
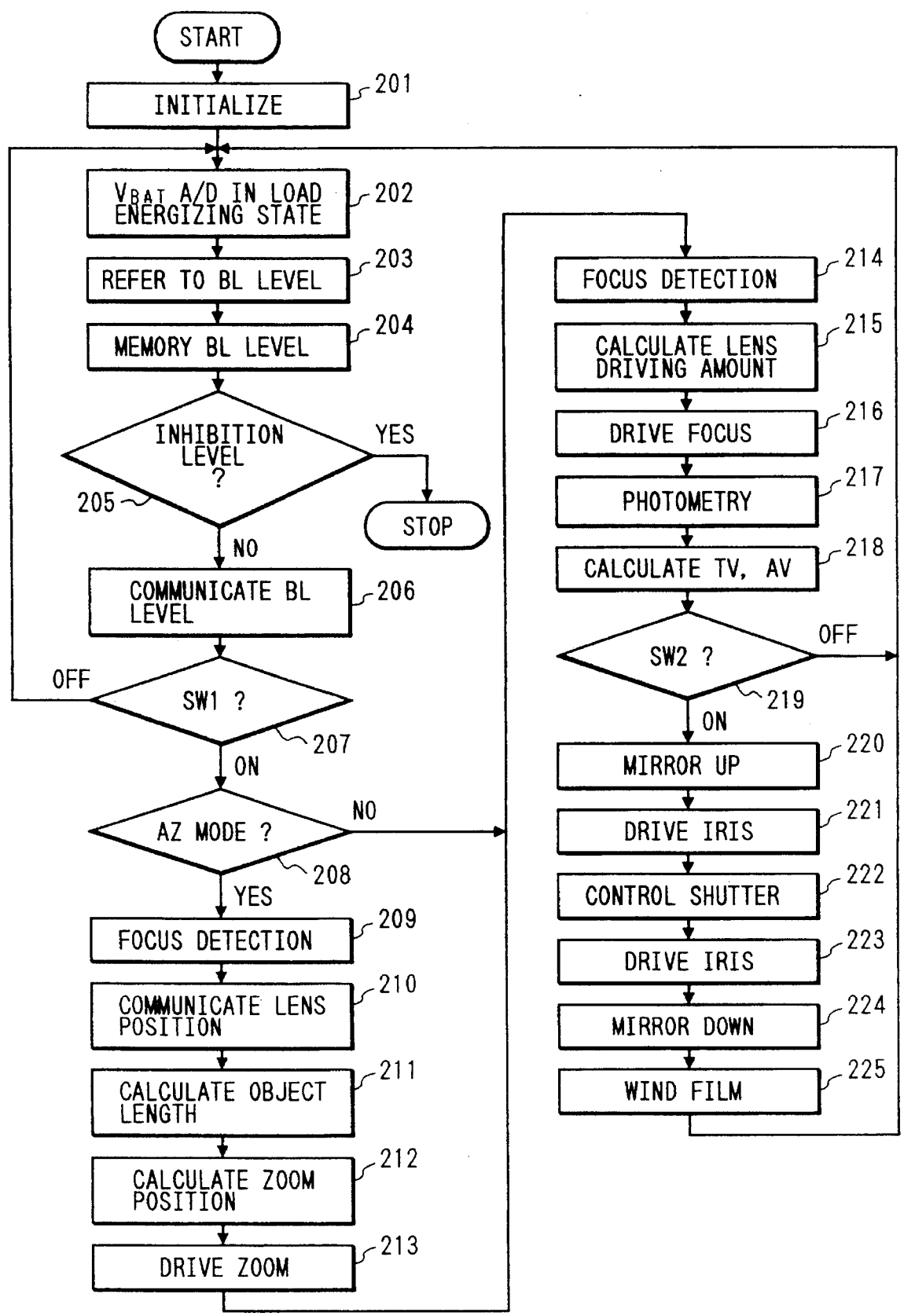
FIG. 11 is a flow chart showing the operation of a microcomputer in a camera according to the fifth embodiment of the present invention.

FIG. 11 is a flow chart showing the operation of the camera microcomputer PRS according to the fifth embodiment of the present invention.

Since the top view of the camera system of the fifth embodiment is the same as that in FIG. 1, and the electrical circuit arrangement of the camera and lens is the same as that shown in FIG. 2, a detailed description thereof will be omitted.

[Step 201] The microcomputer PRS initializes its own ports, memories, and the like, and the flow advances to step 202.

[Step 202] The microcomputer PRS A/D-converts a battery voltage $V_{BAT}$ while energizing proper actuators in the camera, e.g., the shutter magnets MG1 and MG2 as loads so as to acquire a voltage value corresponding to the remaining capacity level (BL level) of the battery. Thereafter, the flow advances to step 203.

[Step 203] The microcomputer PRS obtains a current remaining capacity level of the battery by referring to a predetermined correspondence table between the voltage value and the remaining capacity level of the battery on the basis of the voltage value acquired in step 202.

The correspondence table between the voltage value and the remaining capacity level of the battery will be described below with reference to FIG. 12.

FIG. 12 shows an example of the correspondence table between the voltage value and the remaining capacity level of the battery, and this table is used for determining the remaining capacity level (BL level) of the battery in correspondence with the battery voltage $V_{BAT}$ (V: volts) acquired by A/D conversion in step 202.

In this table, if the battery voltage $V_{BAT}$ obtained by A/D conversion is equal to or higher than "5 V", the remaining capacity level of the battery is determined to be "BL level 4"; if the battery voltage $V_{BAT}$ is equal to or higher than "4 V" and equal to or lower than "4.9 V", the remaining capacity level is determined to be "BL level 3"; if the battery voltage $V_{BAT}$ is equal to or higher than "3 V" and equal to or lower than "3.9 V", the remaining capacity level is determined to be "BL level 2"; if the battery voltage $V_{BAT}$ is equal to or higher than "2.5 V" and equal to or lower than "2.9 V", the remaining capacity level is determined to be "BL level 1"; and if the battery voltage $V_{BAT}$ is equal to or lower than "2.4 V", the remaining capacity level is determined to be "BL level 0".

Note that such a correspondence table is written in advance in the ROM of the microcomputer PRS.

In step 203, the microcomputer PRS acquires the BL level corresponding to the battery voltage obtained by A/D conversion, and the flow advances to step 204. Motor control in the lens LNS corresponding to the BL level will be described later.

[Step 204] The microprocessor PRS stores the BL level acquired in step 203 in its internal memory, and the flow advances to step 205.

[Step 205] The microprocessor PRS checks if the BL level stored in step 204 is "BL level 0". If YES in step 205, the microprocessor PRS determines that the remaining capacity of the battery cannot normally operate the camera and the lens LNS, and inhibits the following operation. If NO in step 205, the flow advances to step 206.

[Step 206] The microcomputer PRS transmits the BL level stored in step 204 to the lens microcomputer LPRS via the lens interface LCM. Thus, the lens microcomputer LPRS can detect the current remaining capacity level of the battery. Thereafter, the flow advances to step 207.

[Step 207] The microcomputer PRS checks if the switch SW1, which is turned on at the first stroke position of the shutter button SWRLS, is ON. If the switch SW1 is OFF, the flow returns to step 202 to repeat the above-mentioned steps. However, if the switch SW1 is ON, the flow advances to step 208.

[Step 208] The microcomputer PRS checks the state of the dial MODESEL for selecting the operation mode 0f the camera so as to check if the selected mode is an auto-zoom mode. If YES in step 208, the flow advances to step 209.

[Step 209] The microcomputer PRS supplies a control signal to the sensor driver SDR to perform accumulation control of the distance measurement (focus detection) sensor SNS, thereby obtaining an image signal. Furthermore, the microcomputer PRS performs a correlation calculation based on the image signal to obtain the current focus shift amount, i.e., a so-called defocus amount. The flow then advances to step 210.

[Step 210] The microcomputer PRS communicates with the lens microcomputer LPRS via the lens interface LCM to acquire the current extension amount of the distance ring. The flow advances to step 211.

[Step 211] The microcomputer PRS calculates a distance to an object on the basis of the defocus amount to the object acquired in step 209, and a current extension amount with reference to an infinity position of the lens LNS acquired in step 210. Thereafter, the flow advances to step 212.

[Step 212] The microcomputer PRS calculates a focal length which is expected to attain an optimal photo-taking magnification on the basis of the photo-taking distance to an object calculated in step 211, and the flow then advances to step 213.

[Step 213] The microcomputer PRS communicates with the lens microcomputer LPRS via the lens interface LCM to instruct driving of the zoom lens LNS, so as to attain the focal length calculated in step 212. Thus, the auto-zoom operation is performed. Thereafter, the flow advances to step 214.

[Step 214] The microcomputer PRS supplies a control signal to the sensor driver SDR to perform accumulation control of the distance measurement (focus detection) sensor SNS so as to acquire an image signal. Furthermore, the microcomputer PRS performs a correlation calculation based on the acquired image signal to obtain a current focus shift amount, i.e., a so-called defocus amount. If the auto-zoom operation is performed, re-distance measurement (re-focus detection) is performed in this state after the zoom operation. However, if the state of the dial MODESEL does not indicate the auto-zoom mode, the flow jumps from step 208 to this step, and distance measurement (focus detection) is performed for the first time. Thereafter, the flow advances to step 215.

[Step 215] The microcomputer PRS calculates a driving amount of the focus lens on the basis of the defocus amount calculated in step 214 so as to attain an in-focus state.

In order to calculate the driving amount of the focus lens, parameters inherent to the lens such as the rate of change in defocus amount upon movement of the focus lens by a unit moving amount are required. In this case, assume that the microcomputer PRS obtains such data as needed via a communication with the lens microcomputer LPRS. Thereafter, the flow advances to step 216.

[Step 216] The microcomputer PRS transmits the lens driving amount calculated in step 215 to the lens microcomputer LPRS via the lens interface LCM to instruct driving of the focus lens. Thus, the auto-focus operation is performed. Thereafter, the flow advances to step 217.

[Step 217] The microcomputer PRS A/D-converts the outputs from the photometry sensor SPC for exposure control so as to acquire object luminance information. Thereafter, the flow advances to step 218.

[Step 218] The microcomputer PRS determines a shutter speed Tv and an iris value Av on the basis of the object luminance information acquired in step 217 so as to attain proper exposure. The flow then advances to step 219.

[Step 219] The microcomputer PRS checks if the switch SW2, which is turned on at the second stroke position of the shutter button SWRLS, is ON. If the switch SW2 is OFF, the flow returns to step 202 to repeat the above-mentioned steps. However, if the switch SW2 is ON, the flow advances to step 220.

[step 220] The microcomputer PRS outputs the signals M2F and M2R to drive the motor MTR2, thereby moving the mirror upward. Then, the flow advances to step 221.

[Step 221] The microcomputer PRS transmits the iris value Av determined in step 218 to the lens microcomputer LPRS via the lens interface LCM to instruct driving of an iris. Thus, the iris is stopped down. Thereafter, the flow advances to step 222.

[Step 222] The microcomputer PRS outputs the signals SMG1 and SMG2 to perform energization control of the transistors TR1 and TR2, thereby driving the shutter. Thus, exposure is performed. Thereafter, the flow advances to step 223.

[Step 223] The microcomputer PRS communicates with the lens microcomputer LPRS via the lens interface LCM to instruct opening of the iris. Thus, the iris is opened. Thereafter, the flow advances to step 224.

[Step 224] The microcomputer PRS outputs the signals M2F and M2R to drive the motor MTR2, thereby moving the mirror downward. Thereafter, the flow advances to step 225.

[Step 225] The microcomputer PRS outputs the signals M1F and M1R to drive the motor MTR1, thereby winding up a film. Thereafter, the flow returns to step 202 to repeat the above-mentioned flow.

The operation of the camera microcomputer PRS has been described.

The operation of the lens microcomputer LPRS will be described below with reference to the flow chart in FIGS. 13A and 13B.

Figure 13B:
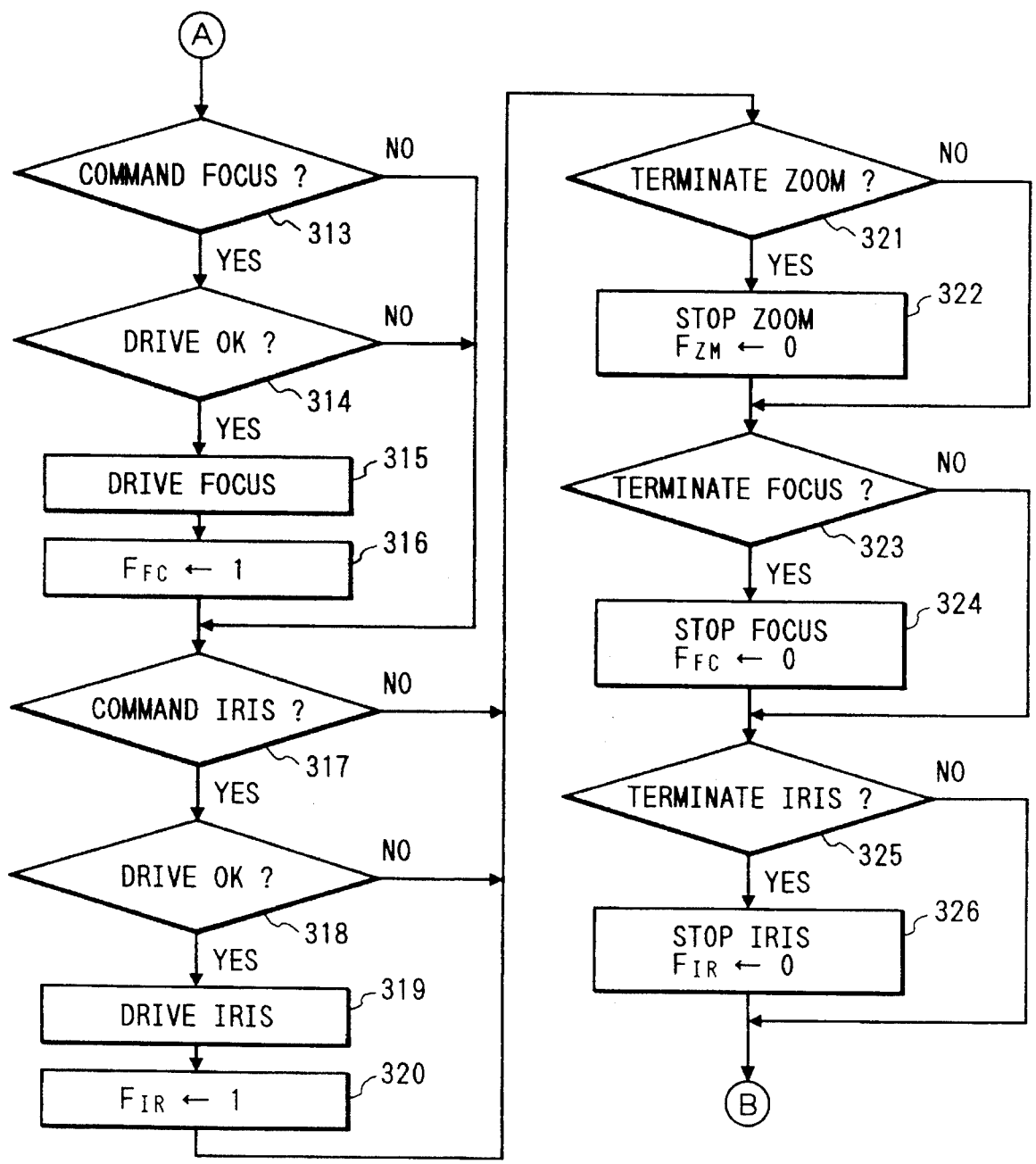
FIG. 13 which is comprised of FIGS. 13A and 13B is a flow chart showing a portion of the operation of a microcomputer in the lens in the fifth embodiment of the present invention.

When the lens LNS is attached to the camera, and the lens microcomputer LPRS is enabled by electrical power supplied from the camera, the lens microcomputer LPRS starts its operation from step 301 in FIGS. 13A and 13B.

[Step 301] The microcomputer LPRS initializes its own ports, memories, and the like, and the flow advances to step 302.

[Step 302] The microcomputer LPRS checks if a communication from the camera microcomputer PRS is detected. If YES in step 302, the flow advances to step 303.

[Step 303] The microcomputer LPRS checks if the communication contents from the camera microcomputer PRS include a command for driving the motor in the lens. If NO in step 303, the flow advances to step 304.

[Step 304] The microcomputer LPRS checks if the communication contents from the camera microcomputer PRS include a transmission request of the BL level described in step 203 above. If NO in step 304, the flow advances to step 305.

[Step 305] If the current communication contents from the camera microcomputer PRS include neither the driving command nor the transmission request of the BL level, the camera microcomputer PRS may be requesting output of data inherent to the lens LNS so as to perform exposure control or the auto-focus operation. Thus, the microcomputer LPRS performs a communication corresponding to such a request. Thereafter, the flow returns to step 302 to repeat the above-mentioned steps.

If it is determined in step 304 that the communication contents from the camera microcomputer PRS include a transmission request of the BL level, the flow jumps from step 304 to step 306.

[Step 306] The microcomputer LPRS receives the information of the BL level from the camera microcomputer PRS. Thus, the lens microcomputer LPRS can detect one of BL levels 1 to 4, which corresponds to the remaining capacity of the battery currently loaded in the camera. Thereafter, the flow advances to step 307.

[Step 307] The microcomputer LPRS sets the number of motors (motor number), which can be simultaneously driven upon driving of the motors in the lens, in its internal memory on the basis of the BL level information acquired in step 306.

Referring back to FIG. 12, for example, if the BL level information received from the camera microcomputer PRS indicates "BL level 4", the microcomputer LPRS sets the number of motors, which can be simultaneously driven upon driving of the motors in the lens LNS, to be "3". Similarly, if the BL level information received from the camera microcomputer PRS indicates "BL level 3", the microcomputer LPRS sets the number of motors, which can be simultaneously driven upon driving of the motors in the lens LNS, to be "2". If the BL level information received from the camera microcomputer PRS indicates "BL level 2" or "BL level 1", the microcomputer LPRS sets the number of motors, which can be simultaneously driven upon driving of the motors in the lens LNS, to be "1".

Upon completion of the above-mentioned setting operation, the flow returns from step 307 to step 302 to repeat the above-mentioned steps.

Thereafter, if the camera microcomputer PRS supplies a command for driving the motors in the lens LNS, the lens microcomputer LPRS detects this command in step 303, and the flow advances to step 308.

[Step 308] The microcomputer LPRS checks if the operation member ZMLNG is operated, and signal pulses are input from the switches ZDL1 and ZDL2. If NO in step 308, the flow advances to step 309.

[Step 309] The microcomputer LPRS checks if the driving command transmitted from the camera microcomputer PRS is a command for driving the zoom motor. If YES in step 309, the flow advances to step 310.

[Step 310] The microcomputer LPRS checks the relationship between the number of motors which can be simultaneously driven, and is set in step 307, and the number of motors which are being currently driven so as to determine if the zoom motor can be started. In this state, since none of motors are driven, the zoom motor can be driven. Therefore, the flow advances to step 311.

[Step 311] The microcomputer LPRS starts driving of the zoom motor in accordance with the driving command transmitted from the camera microcomputer PRS. The flow then advances to step 312.

[Step 312] The microcomputer LPRS sets a flag $F_{ZM}$ indicating whether the zoom motor is being driven, to "1" in its internal memory. The flow then advances to step 313.

If it is determined in step 308 that the operation member ZMLNG is operated, and signal pulses are input from the switches ZDL1 and ZDL2, the flow jumps from step 308 to step 313 without executing steps 309, 310, 311, and 312 so as to preferentially perform a manual zoom operation. Also, if it is determined in step 309 that the driving command transmitted from the camera microcomputer PRS is not a command for driving the zoom motor, the flow branches from Step 309 to step 313. Furthermore, if it is determined in step 310 that a flag indicating that another motor is already being driven is set to be "1", and the number of motors which are being currently driven is equal to the number of motors which can be simultaneously driven, and is set in step 307, since the zoom motor cannot be additionally driven, the flow branches from step 310 to step 313.

[Step 313] The microcomputer LPRS checks if the driving command transmitted from the camera microcomputer PRS is a command for driving the focus motor. If YES in step 313, the flow advances to step 314.

[Step 314] The microcomputer LPRS checks the relationship between the number of motors which can be simultaneously driven, and is set in step 307, and the number of motors which are being currently driven so as to determine if the focus motor can be started.

For example, as has been described in step 312 above, if the flag $F_{ZM}$ indicating whether the zoom motor is being driven is set to "1", and the number of motors which can be simultaneously driven, and is set in step 307 is "1", it is determined in this step that the focus motor cannot be driven. In this case, assuming that the focus motor can be driven, the flow advances to step 315.

[Step 315] The microcomputer LPRS starts driving of the focus motor in accordance with the driving command transmitted from the camera microcomputer PRS. The flow then advances to step 316.

[Step 316] The microcomputer LPRS sets a flag $F_{FC}$ indicating whether the focus motor is being driven, to "1" in its internal memory. The flow then advances to step 317.

Also, if it is determined in step 313 that the driving command transmitted from the camera microcomputer PRS is not a command for driving the focus motor, the flow branches from step 313 to step 317. Furthermore, if it is determined in step 314 that the focus motor cannot be driven, the flow branches from step 314 to step 317.

[Step 317] The microcomputer LPRS checks if the driving command transmitted from the camera microcomputer PRS is a command for driving the iris driving motor. If YES in step 317, the flow advances to step 318.

[Step 318] The microcomputer LPRS checks the relationship between the number of motors which can be simultaneously driven, and is set in step 307, and the number of motors which are being currently driven so as to determine if the iris driving motor can be started. This decision step is performed in the same manner as in step 314 described above. If it is determined that the iris driving motor can be driven, the flow advances to step 319.

[Step 319] The microcomputer LPRS starts driving of the iris driving motor in accordance with the driving command transmitted from the camera microcomputer PRS. Thereafter, the flow advances to step 320.

[Step 320] The microcomputer LPRS sets a flag indicating whether the iris driving motor is being driven, to "1" in its internal memory. The flow then advances to step 321.

Also, if it is determined in step 317 that the driving command transmitted from the camera microcomputer PRS is not a command for driving the iris driving motor, the flow branches from step 317 to step 321. Furthermore, if it is determined in step 318 that the iris driving motor cannot be driven, the flow branches from step 318 to step 321.

[Step 321] The microcomputer LPRS checks if the driving amount of the zoom motor which was started in step 311 reaches a predetermined amount. If YES in step 321, the flow advances to step 322.

[Step 322] The microcomputer LPRS ends the driving operation of the zoom motor, and clears the flag $F_{ZM}$ indicating whether the zoom motor is being driven, to "0" accordingly.

When the flag $F_{ZM}$ is cleared to "0", if the driving operation is inhibited in step 314 under the condition that the zoom motor is being driven, this condition is canceled. Therefore, when the flow reaches step 314 next time, the driving operation of the focus motor is permitted. Thereafter, the flow advances to step 323.

If it is determined in step 321 that the driving amount of the zoom motor does not reach a predetermined amount, the flow jumps to step 323 without executing step 322.

[Step 323] The microcomputer LPRS checks if the driving amount of the focus motor which was started in step 315 reaches a predetermined amount. If YES in step 323, the flow advances to step 324.

[Step 324] The microcomputer LPRS ends the driving operation of the focus motor, and clears the flag $F_{FC}$ indicating whether the focus motor is being driven, to "0" accordingly.

The effect obtained when the flag $F_{FC}$ is cleared to "0" is the same as that obtained when the flag $F_{ZM}$ is cleared to "0", as has been described above in step 322. For example, if the driving operation of the zoom motor is inhibited in step 310 under the condition that the focus motor is being driven, this condition is canceled. Therefore, when the flow reaches step 310 next time, the driving operation of the zoom motor is permitted. Thereafter, the flow advances to step 325.

If it is determined in step 323 that the driving amount of the focus motor does not reach a predetermined amount, the flow jumps to step 325 without executing step 324.

[Step 325] The microcomputer LPRS checks if the driving amount of the iris driving motor which was started in step 317 reaches a predetermined amount. If YES in step 325, the flow advances to step 326.

[Step 326] The microcomputer LPRS ends the driving operation of the iris driving motor, and clears the flag $F_{IR}$ indicating whether the iris driving motor is being driven, to "0" accordingly.

It can be considered that the effect obtained when the flag $F_{IR}$ is cleared to "0" is the same as that obtained when the flag $F_{ZM}$ is cleared to "0" in step 322 above or that obtained when the flag $F_{FC}$ is cleared to "0" in step 324 above. Thereafter, the flow returns to step 302.

If it is determined in step 325 that the driving amount of the iris driving motor does not reach a predetermined amount, the flow returns from step 325 to step 302.

Figure 14:
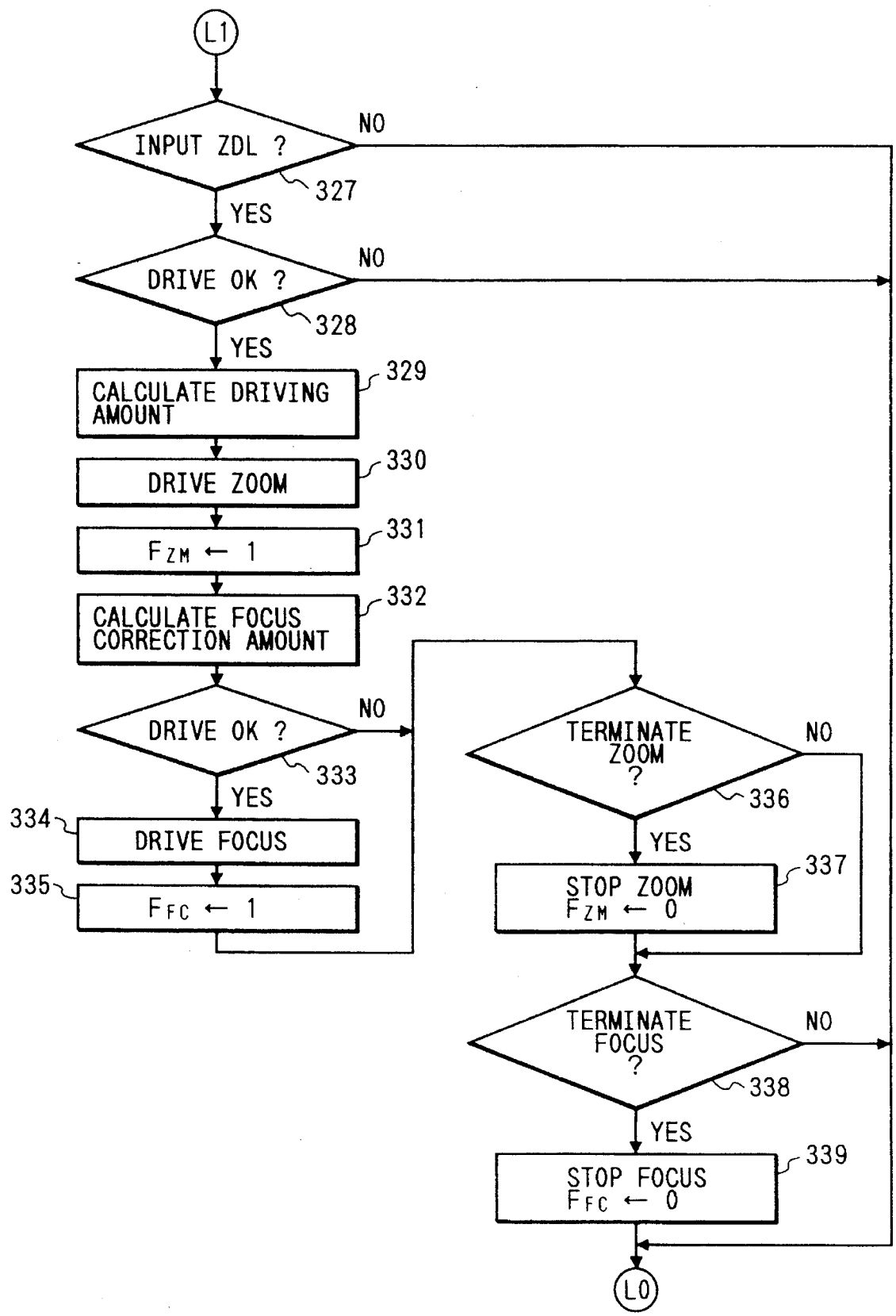
FIG. 14 is a flow chart showing the operation continued from FIGS. 13A and 13B.

If it is determined in step 302 that a communication from the camera microcomputer PRS is not detected, the flow advances from step 302 to step 327 in FIG. 14.

[Step 327] The microcomputer LPRS checks if the operation member ZMLNG is operated, and signal pulses are input from the switches ZDL1 and ZDL2. If YES in step 327, the flow advances to step 328 to execute a manual zoom operation.

[Step 328] The microcomputer LPRS checks the relationship between the number of motors which can be simultaneously driven, and is set in step 307, and the number of motors which are being currently driven so as to determine if the zoom motor can be started. If YES in step 328, the flow advances to step 329.

[Step 329] The microcomputer LPRS calculates a driving amount of the zoom motor on the basis of the number of signal pulses from the switches ZDL1 and ZDL2 upon operation of the operation member ZMLNG. Thereafter, the flow advances to step 330.

[Step 330] The microcomputer LPRS starts the driving operation of the zoom motor in accordance with the driving amount calculated in step 329. Thereafter, the flow advances to step 331.

[Step 331] The microcomputer LPRS sets the flag $F_{ZM}$ indicating whether the zoom motor is being driven, to "1" in its internal memory. The flow then advances to step 332.

[Step 332] The microcomputer LPRS calculates a focus moving amount due to the movement of a variable power optical system upon driving of the zoom motor, and calculates a driving amount of the focus lens LNS to compensate for the focus moving amount. Thereafter, the flow advances to step 333.

[Step 333] The microcomputer LPRS checks the relationship between the number of motors which can be simultaneously driven, and is set in step 307, and the number of motors which are being currently driven so as to determine if the focus motor can be started. If YES in step 333, the flow advances to step 334.

[Step 334] The microcomputer LPRS starts the driving operation of the focus motor in accordance with the driving amount of the focus lens calculated in step 332, and the flow advances to step 335.

[Step 335] The microcomputer LPRS sets the flag $F_{FC}$ indicating whether the focus motor is being driven, to "1" in its internal memory. The flow then advances to step 336.

If it is determined in step 333 that the focus motor cannot be driven, the flow also branches from step 333 to step 336.

[Step 336] The microcomputer LPRS checks if the driving amount of the zoom motor which was started in step 330 reaches a predetermined amount. If YES in step 336, the flow advances to step 337.

[Step 337] The microcomputer LPRS ends the driving operation of the zoom motor, and clears the flag $F_{ZM}$ indicating whether the zoom motor is being driven, to "0" accordingly.

It can be considered that the effect obtained when the flag $F_{ZM}$ is cleared to "0" is the same as that obtained when the flag $F_{ZM}$ is cleared to "0" in step 322 above or that obtained when the flag $F_{FC}$ is cleared to "0" in step 324 above. Thereafter, the flow advances to step 338.

If it is determined in step 336 that the driving amount of the zoom motor does not reach a predetermined amount, the flow also branches from step 336 to step 338.

[Step 338] The microcomputer LPRS checks if the driving amount of the zoom motor which was started in step 334 reaches a predetermined amount. If YES in step 338, the flow advances to step 339.

[Step 339] The microcomputer LPRS ends the driving operation of the focus motor, and clears the flag $F_{FC}$ indicating whether the focus motor is being driven, to "0" accordingly.

It can be considered that the effect obtained when the flag $F_{FC}$ is cleared to "0" is the same as that obtained when the flag $F_{ZM}$ is cleared to "0" in step 322 above or that obtained when the flag $F_{FC}$ is cleared to "0" in step 324 above. Thereafter, the flow returns to step 302 in FIGS. 13A and 13B.

If it is determined in step 338 that the driving amount of the focus motor does not reach a predetermined amount, the flow returns from step 338 to step 302 in FIGS. 13A and 13B. Furthermore, if it determined in step 327 that the operation member ZMLNG is not operated, and signal pulses are not input from the switches ZDL1 and ZDL2, the flow returns from step 327 to step 302 in FIGS. 13A and 13B. Also, if it is determined in step 328 that the zoom motor cannot be driven, the flow returns from step 328 to step 302 in FIGS. 13A and 13B.

The operation of the lens microcomputer LPRS has been described.

(Sixth Embodiment)

In the fifth embodiment described above, by switching the number of motors to be simultaneously driven in the lens LNS on the basis of the BL level information transmitted from the camera microcomputer PRS to the lens microcomputer LPRS, actuators in the lens are controlled to attain a required electrical power level suitable for the remaining capacity level of the battery. When the required electrical level can be changed by executing speed control of the motors in the lens LNS, the sixth embodiment to be described below may be proposed.

Since the top view of the camera system of the sixth embodiment is the same as that in FIG. 1, and the electrical circuit arrangement of the camera and lens is the same as that shown in FIG. 2, a detailed description thereof will be omitted. In addition, since the operation of the camera microcomputer PRS is the same as that in the fifth embodiment, a detailed description thereof will be omitted.

Figure 15B:
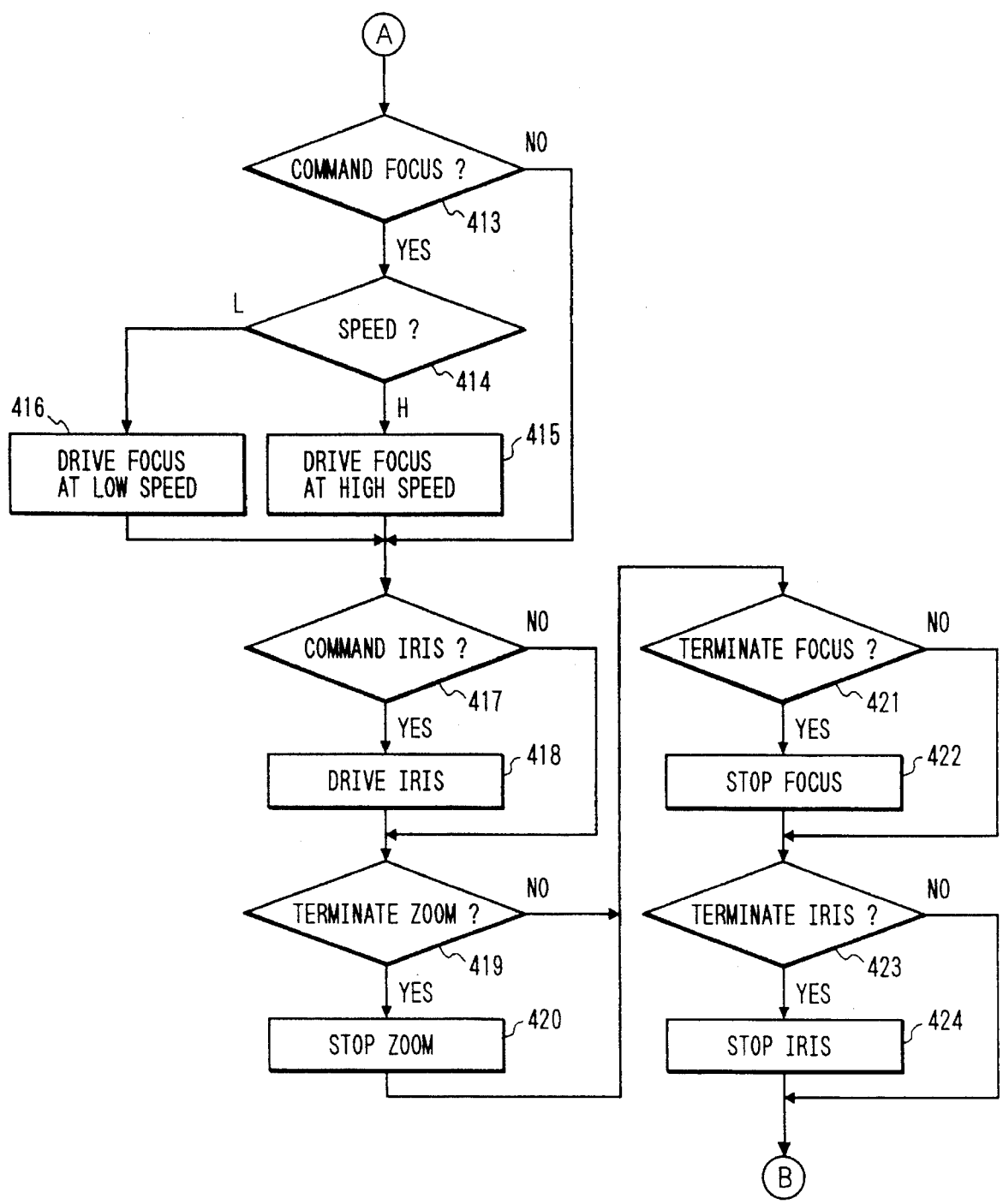
FIG. 15 which is comprised of FIGS. 15A and 15B is a flow chart showing a portion of the operation of a microcomputer in the lens in the sixth embodiment of the present invention.

When the lens LNS is attached to the camera, and the lens microcomputer LPRS is enabled by electrical power supplied from the camera, the lens microcomputer LPRS starts its operation from step 401 in FIGS. 15A and 15B.

[Step 401] The microcomputer LPRS initializes its own ports, memories, and the like, and the flow advances to step 402.

[Step 402] The microcomputer LPRS checks if a communication from the camera microcomputer PRS is detected. If YES in step 402, the flow advances to step 403.

[Step 403] The microcomputer LPRS checks if the communication contents from the camera microcomputer PRS include a command for driving the motor in the lens LNS. If NO in step 403, the flow advances to step 404.

[Step 404] The microcomputer LPRS checks if the communication contents from the camera microcomputer PRS include a transmission request of the BL level described in step 203 above. If NO in step 404, the flow advances to step 405.

[Step 405] If the current communication contents from the camera microcomputer PRS include neither the driving command nor the transmission request of the BL level, the camera microcomputer PRS may be requesting output of data inherent to the lens LNS so as to perform exposure control or the auto-focus operation. Thus, the microcomputer LPRS performs a communication corresponding to such a request. Thereafter, the flow returns to step 402 to repeat the above-mentioned steps.

If it is determined in step 404 that the communication contents from the camera microcomputer PRS include a transmission request of the BL level, the flow jumps from step 404 to step 406.

[Step 406] The microcomputer LPRS receives the information of the BL level from the camera microcomputer PRS. Thus, the lens microcomputer LPRS can detect one of BL levels 1 to 4, which corresponds to the remaining capacity of the battery currently loaded in the camera. Thereafter, the flow advances to step 407.

[Step 407] The microcomputer LPRS sets the possible driving speed upon driving of the motors in the lens LNS in its internal memory.

This setting operation will be explained below with reference to FIG. 17. If the information of the BL level received from the camera microcomputer PRS indicates "BL level 4", the microcomputer LPRS sets the possible driving speed upon driving of motors in the lens LNS to be H (high speed). Similarly, if the information of the BL level indicates "BL level 3", the microcomputer LPRS also sets the possible driving speed upon driving of motors in the lens LNS to be H (high speed). If the information of the BL level indicates "BL level 2" or "BL level 1", the microcomputer LPRS sets the possible driving speed upon driving of motors in the lens LNS to be L (low speed).

Upon completion of the above-mentioned setting operation, the flow returns to step 402 to repeat the above-mentioned steps.

Thereafter, if the camera microcomputer PRS supplies a command for driving the motors in the lens LNS, the lens microcomputer LPRS detects this command in step 403, and the flow advances to step 408.

[Step 408] The microcomputer LPRS checks if the operation member ZMLNG is operated, and signal pulses are input from the switches ZDL1 and ZDL2. If NO in step 408, the flow advances to step 409.

[Step 409] The microcomputer LPRS checks if the driving command transmitted from the camera microcomputer PRS is a command for driving the zoom motor. If YES in step 409, the flow advances to step 410.

[Step 410] The microcomputer LPRS checks if the possible driving speed set in step 407 is H (high speed) or L (low speed). If the possible driving speed set in step 407 is H (high speed), the flow advances to step 411.

[Step 411] The microcomputer LPRS starts driving of the zoom motor at high speed in accordance with the driving command transmitted from the camera microcomputer PRS. The flow then advances to step 413.

If it is determined in step 410 that the possible driving speed set in step 407 is L (low speed), the flow advances from step 410 to step 412.

[Step 412] The microcomputer LPRS starts driving of the zoom motor at low speed in accordance with the driving command transmitted from the camera microcomputer PRS. The flow then advances to step 413.

If it is determined in step 408 that the operation member ZMLNG is operated, and signal pulses are input from the switches ZDL1 and ZDL2, the flow branches from step 408 to step 413 so as to preferentially perform a manual zoom operation. Also, if it is determined in step 409 that the driving command transmitted from the camera microcomputer PRS is not a command for driving the zoom motor, the flow branches from step 409 to step 413.

[step 413] The microcomputer LPRS checks if the driving command transmitted from the camera microcomputer PRS is a command for driving the focus motor. If YES in step 413, the flow advances to step 414.

[Step 414] The microcomputer LPRS checks if the possible driving speed set in step 407 is H (high speed) or L (low speed). If the possible driving speed set in step 407 is H (high speed), the flow advances to step 415.

[Step 415] The microcomputer LPRS starts driving of the focus motor at high speed in accordance with the driving command transmitted from the camera microcomputer PRS. The flow then advances to step 417.

If it is determined in step 414 that the possible driving speed set in step 407 is L (low speed), the flow advances from step 414 to step 416.

[Step 416] The microcomputer LPRS starts driving of the focus motor at low speed in accordance with the driving command transmitted from the camera microcomputer PRS. The flow then advances to step 417.

Also, if it is determined in step 413 that the driving command transmitted from the camera microcomputer PRS is not a command for driving the focus motor, the flow branches from step 413 to step 417.

[Step 417] The microcomputer LPRS checks if the driving command transmitted from the camera microcomputer PRS is a command for driving the iris driving motor. If YES in step 417, the flow advances to step 418.

[Step 418] The microcomputer LPRS starts driving of the iris driving motor in accordance with the driving command transmitted from the camera microcomputer PRS.

In this embodiment, the driving speed of the iris driving motor is not switched. This is because a significant decrease in electrical power consumption may not be expected when a stepping motor normally used as the iris driving motor is driven at low speed. Thereafter, the flow advances to step 419.

Also, if it is determined in step 417 that the driving command transmitted from the camera microcomputer PRS is not a command for driving the iris driving motor, the flow branches from step 417 to step 419.

[Step 419] The microcomputer LPRS checks if the driving amount of the zoom motor which was started in step 411 or 412 reaches a predetermined amount. If YES in step 419, the flow advances to step 420.

[Step 420] The microcomputer LPRS ends the driving operation of the zoom motor. Then, the flow advances to step 421.

If it is determined in step 419 that the driving amount of the zoom motor does not reach a predetermined amount, the flow jumps to step 421 without executing step 420.

[Step 421] The microcomputer LPRS checks if the driving amount of the focus motor which was started in step 415 or 416 reaches a predetermined amount. If YES in step 421, the flow advances to step 422.

[Step 422] The microcomputer LPRS ends the driving operation of the focus motor. Then, the flow advances to step 423.

If it is determined in step 421 that the driving amount of the focus motor does not reach a predetermined amount, the flow jumps to step 423 without executing step 422.

[Step 423] The microcomputer LPRS checks if the driving amount of the iris driving motor which was started in step 418 reaches a predetermined amount. If YES in step 423, the flow advances to step 424.

[Step 424] The microcomputer LPRS ends the driving operation of the iris driving motor. Then, the flow returns to step 402.

If it is determined in step 423 that the driving amount of the iris driving motor does not reach a predetermined amount, the flow returns from step 423 to step 402.

Figure 16:
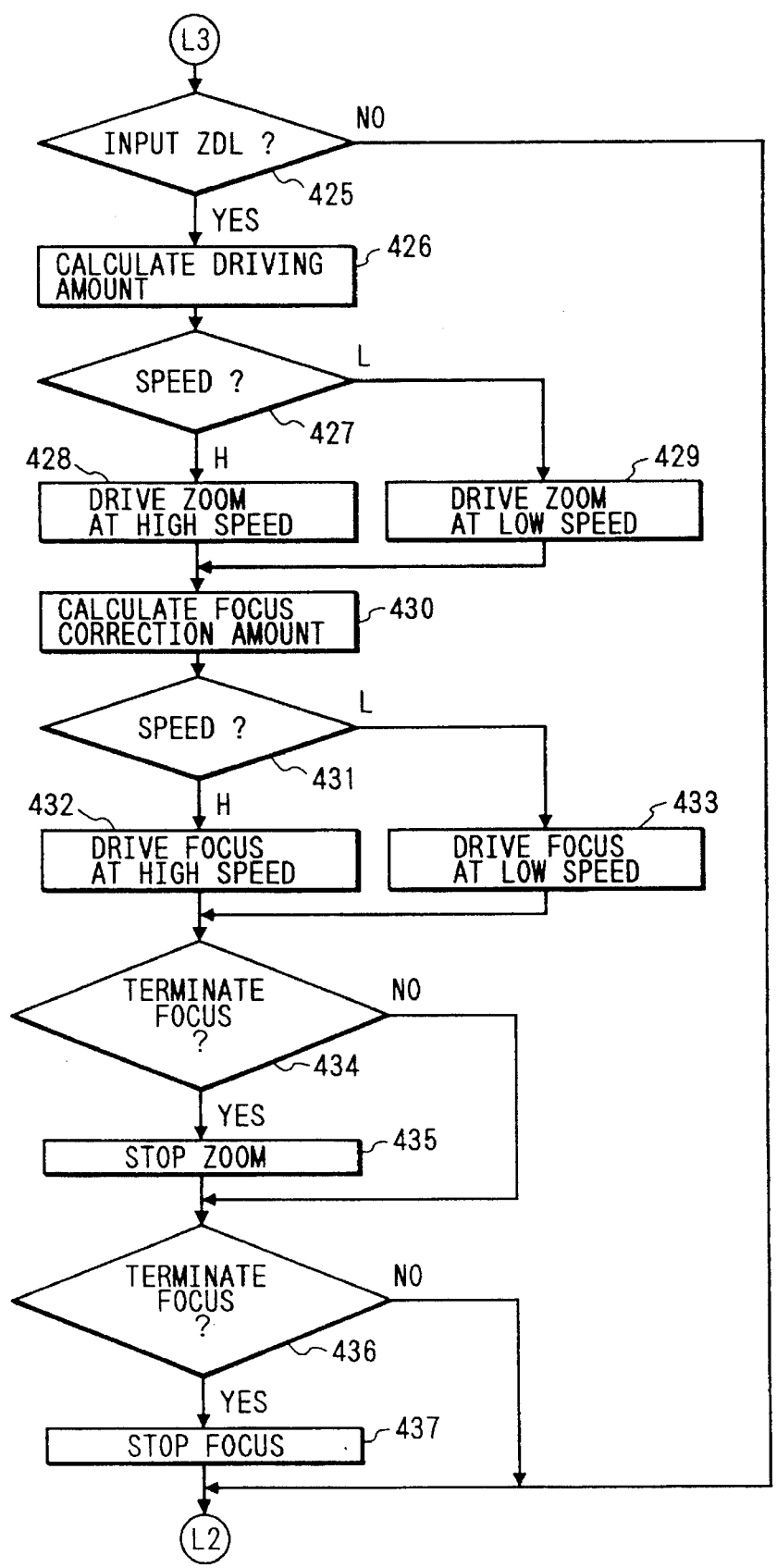
FIG. 16 is a flow chart showing the operation continued from FIGS. 15A and 15B.

If it is determined in step 402 that a communication from the camera microcomputer PRS is not detected, the flow advances from step 402 to step 425 in FIG. 16.

[Step 425] The microcomputer LPRS checks if the operation member ZMLNG is operated, and signal pulses are input from the switches ZDL1 and ZDL2. If YES in step 427, the flow advances to step 426 to execute a manual zoom operation.

[Step 426] The microcomputer LPRS calculates a driving amount of the zoom motor on the basis of the number of signal pulses from the switches ZDL1 and ZDL2 upon operation of the operation member ZMLNG. Thereafter, the flow advances to step 427.

[Step 427] The microcomputer LPRS checks if the possible driving speed set in step 407 is H (high speed) or L (low speed). If the possible driving speed set in step 407 is H (high speed), the flow advances to step 428.

[Step 428] The microcomputer LPRS starts the driving operation of the zoom motor in accordance with the driving amount calculated in step 426.

In this case, since a zoom operation is manually performed, the driving speed of the zoom motor depends on the rates of signal pulses from the switches ZDL1 and ZDL2 upon operation of the operation member ZMLNG. Therefore, a high-speed driving operation is not always performed, but a high-speed driving operation is allowed if the signal pulses from the switches ZDL1 and ZDL2 are high-speed pulses. Thereafter, the flow advances to step 430.

If it is determined step 427 that the possible driving speed set in step 407 is L (low speed), the flow branches from step 427 to step 429.

[Step 429] The microcomputer LPRS starts the driving operation of the zoom motor in accordance with the driving amount calculated in step 426.

In this case, since a zoom operation is manually performed, the driving speed of the zoom motor depends on the rates of signal pulses from the switches ZDL1 and ZDL2 upon operation of the operation member ZMLNG. Therefore, although a low-speed driving operation is not always performed, since a high-speed driving operation is inhibited, a driving operation at a speed equal to or lower than a predetermined speed is allowed. Thereafter, the flow advances to step 430.

[Step 430] The microcomputer LPRS calculates a focus moving amount due to the movement of a variable power optical system upon driving of the zoom motor, and calculates a driving amount of the focus lens to compensate for the focus moving amount. Thereafter, the flow advances to step 431.

[Step 431] The microcomputer LPRS checks if the possible driving speed set in step 407 is H (high speed) or L (low speed). If the possible driving speed set in step 407 is H (high speed), the flow advances to step 432.

[Step 432] The microcomputer LPRS starts the driving operation of the focus motor at high speed in accordance with the driving amount of the focus lens calculated in step 430. Thereafter, the flow advances to step 434.

If it is determined in step 431 that the possible driving speed set in step 407 is L (low speed), the flow branches from step 431 to step 433.

[Step 433] The microcomputer LPRS starts the driving operation of the focus motor at low speed in accordance with the driving amount of the focus lens calculated in step 430. Thereafter, the flow advances to step 434.

[Step 434] The microcomputer LPRS checks if the driving amount of the zoom motor which was started in step 428 or 429 reaches a predetermined amount. If YES in step 434, the flow advances to step 435.

[Step 435] The microcomputer LPRS ends the driving operation of the zoom motor. Then, the flow advances to step 436.

If it is determined in step 434 that the driving amount of the zoom motor does not reach a predetermined amount, the flow also branches from step 434 to step 436.

[Step 436] The microcomputer LPRS checks if the driving amount of the focus motor which was started in step 432 or 433 reaches a predetermined amount. If YES in step 436, the flow advances to step 437.

[Step 437] The microcomputer LPRS ends the driving operation of the focus motor. Then, the flow returns to step 402 in FIGS. 15A and 15B.

If it is determined in step 436 that the driving amount of the focus motor does not reach a predetermined amount, the flow returns from step 436 to step 402 in FIGS. 15A and 15B. Furthermore, if it is determined in step 425 that the operation member ZMLNG is not operated, and signal pulses are not input from the switches ZDL1 and ZDL2, the flow returns from step 425 to step 402 in FIGS. 15A and 15B.

The operation of the lens microcomputer LPRS in the sixth embodiment has been described.

(Seventh Embodiment)

In the sixth embodiment described above, the driving speed of the motor in the lens is simply switched between two speeds, i.e., high speed and low speed on the basis of BL level information transmitted from the camera microcomputer PRS to the lens microcomputer LPRS. However, if a contemporary technique such as a microcomputer, or the like, is used, finer speed control can be performed, as a matter of course.

FIG. 18 shows an example of finer speed switching control than that in the sixth embodiment. In this example, the speeds of the zoom motor and the focus motor are independently switched based on the BL level, and each of the zoom motor and focus motor has middle speed (M) in addition to high speed (H) and low speed (L).

According to this embodiment, at "BL level 4", both the focus and zoom motors can be driven at high speed (H). At "BL level 3", the focus motor can be driven at high speed (H), and the zoom motor can be driven at middle speed (M). At "BL level 2", the focus motor can be driven at middle speed (M), and the zoom motor can be driven at low speed (L). At "BL level 1", both the focus and zoom motors can be driven at low speed (L).

Note that the present invention is not limited to the lens which mounts three different motors, i.e., the zoom motor, focus motor, and iris driving motor described in each of the above embodiments. For example, the present invention may be applied to various other lenses such as a lens having an actuator for driving an image blur prevention function, a lens having a variable aberration actuator, a lens having an actuator for driving a tilt or shift function, and the like.

What is claimed is:

1. A camera system which is constituted by a plurality of auxiliary devices comprising different loads driven by a power supply of a camera, and a camera which interchangeably mounts said auxiliary devices, comprising:

(a) detection means for detecting a load state of the auxiliary device mounted on said camera;

(b) setting means for setting a battery check level in accordance with the load state detected by said detection means, said setting means setting a different level in accordance with the load state of the mounted auxiliary device if the load is different; and (c) a check circuit for performing a battery checking operation of a power supply output on the basis of the battery check level.

2. A system according to claim 1, wherein said detection means detects the number of actuators in the mounted auxiliary device, and said setting means sets the battery check level in accordance with the detected number of actuators.

3. A system according to claim 1, wherein said detection means detects an electrical power consumption level of the load of the mounted auxiliary device, and said setting means sets the battery check level in accordance with the detected electrical power consumption level.

4. A system according to claim 1, wherein said auxiliary device is an interchangeable lens device.

5. A system according to claim 1, wherein said check circuit inhibits an operation of said camera based on the check result when the check result indicates that the power supply output is lower than a check level.

6. A system according to claim 1, wherein said auxiliary device is connected to said camera via a contact, and transmits data indicating the load state to said camera via said contact.

7. A camera system which is constituted by a plurality of auxiliary devices each comprising a plurality of loads driven by a power supply of a camera, and a camera which interchangeably mounts said auxiliary devices, comprising:
 (a) a communication circuit for transmitting information corresponding to an output of the power supply of the camera to a mounted auxiliary device; and
 (b) a regulation circuit, said circuit being provided to the auxiliary device, for regulating the number of loads which are simultaneously driven, on the basis of the transmitted information.

8. A system according to claim 7, wherein said regulation circuit comprises a set circuit for setting the number of loads, which are simultaneously driven, on the basis of the transmitted information, and a control circuit for, when the loads corresponding to the number of loads set by said set circuit are simultaneously driven, starting a driving operation of another load after waiting for the end of a driving operation of at least one of the driven loads.

9. A camera system which is constituted by a plurality of auxiliary devices each comprising a plurality of motors driven by a power supply of a camera, and a camera which interchangeably mounts said auxiliary devices, comprising:
 (a) a switching circuit for switching driving speeds of motors on the basis of an output from the power supply.

10. A system according to claim 7, wherein said mounted auxiliary device is an interchangeable lens device.

11. A system according to claim 9, wherein said mounted auxiliary device is an interchangeable lens device.

12. A camera system which is constituted by a plurality of auxiliary devices comprising different loads driven by a power supply of a camera, and a camera which interchangeably mounts said auxiliary devices, comprising:
 (a) detection means for detecting a load state of the auxiliary device mounted on said camera;
 (b) vary means for varying a battery check level in accordance with the load state detected by said detection means; and
 (c) a check circuit for performing a battery checking operation of a power supply output on the basis of the battery check level.

13. A camera which interchangeably mounts a plurality of auxiliary devices comprising different loads driven by a power supply of a camera, comprising:
 (a) detection means for detecting a load state of the auxiliary device mounted on said camera;
 (b) vary means for varying a battery check level in accordance with the load state detected by said detection means; and
 (c) a check circuit for performing a battery checking operation of a power supply output on the basis of the battery check level.

14. A camera system which is constituted by a plurality of auxiliary devices comprising different loads driven by a power supply of a camera, and a camera which interchangeably mounts said auxiliary devices, comprising:
 (a) detection means for detecting the auxiliary device mounted on said camera;
 (b) vary means for varying a battery check level in accordance with a detection result by said detection means; and
 (c) a check circuit for performing a battery checking operation of a power supply output on the basis of the battery check level.

15. A camera which interchangeably mounts a plurality of auxiliary devices comprising different loads driven by a power supply of a camera, comprising:
 (a) detection means for detecting the auxiliary device mounted on said camera;
 (b) vary means for varying a battery check level in accordance with a detection result by said detection means; and
 (c) a check circuit for performing a battery checking operation of a power supply output on the basis of the battery check level.

16. An auxiliary device having a plurality of motors driven by a power supply of a camera, comprising:
 (a) a switching circuit for switching driving speeds of motors on the basis of an output from the power supply.

17. An auxiliary device having a plurality of loads driven by a power supply of a camera, comprising:
 (a) a communication circuit for performing a communication with the camera; and
 (b) a regulation circuit for regulating the number of loads, which are simultaneously driven, on the basis of information corresponding to an output of the power supply transmitted by said communication circuit.

18. A camera system which is constituted by an accessory device including a plurality of load members and by a camera to which the accessory device is detachably mounted, the camera system comprising:
 (a) a detection circuit for detecting a voltage of a power supply of the camera;
 (b) a set circuit for setting data corresponding to the detection result by said detection circuit;
 (c) a communication circuit for transmitting the data set by said set circuit to a receiving circuit of the accessory device; and
 (d) a driving control circuit for setting a number of load members which are simultaneously driven in accordance with the data of the receiving circuit.

19. A camera system according to claim 18, wherein said accessory device comprises at least three load members, and said driving control circuit simultaneously drives two load members when the set number of load members according to the data is two, and said driving control circuit starts to drive other load members when the driving of at least one of the load members is completed.

20. A camera system according to claim 18, wherein the accessory device is an interchangeable lens.

21. A camera system which is constituted by a plurality of accessory devices having a different load circuit from each other and by a camera to which the accessory device is interchangeably mounted, the camera system comprising:
 (a) a data circuit of the load circuit provided to the accessory device;
 (b) a communication circuit for transmitting data of the data circuit to a receiving circuit of the camera; and
 (c) a set circuit for setting a detection level of a voltage detection circuit of the camera in accordance with the data received by the receiving circuit.

22. A camera system according to claim 21, wherein said set circuit has a memory circuit from which information having a different detection level is read as a function of the data.

23. A camera system according to claim 22, wherein the accessory device is an interchangeable lens.

24. A camera system which is constituted by a camera to which an accessory device having a motor is detachably mounted, the camera system comprising:
   (a) a detection circuit for detecting a voltage of a power supply of the camera;
   (b) a set circuit for setting data corresponding to the detection result by said detection circuit;
   (c) a communication circuit for transmitting the data set by said set circuit to a receiving circuit of the accessary device; and
   (d) a speed adjustment circuit for setting a driving speed of the motor in accordance with the data of the receiving circuit.

25. A camera system according to claim 24, wherein the accessory device comprises a plurality of motors including at least a first and second motor, and said speed adjustment circuit has a selection circuit which selects one of a different-speed state and another state, wherein, in the different-speed state, the first and the second motors are controlled to operate at different speeds.

26. A camera system according to claim 24, wherein the accessory device is an interchangeable lens.

* * * * *

UNITED STATES PATENT AND TRADEMARK OFFICE
CERTIFICATE OF CORRECTION

PATENT NO. : 5,557,365
DATED : September 17, 1996
INVENTOR(S) : TOSHIFUMI OHSAWA It is certified that error appears in the above-indentified patent and that said Letters Patent is hereby corrected as shown below:

Column 4

Line 18, "to a" should read --to as a--.
Line 48, "photomerry" should read --photometry--.

Column 16

Line 13, "Of" should read --of--.

Column 17

Line 19, "[step" should read --[Step--.

Column 23

Line 49, "[step" should read --[Step--.

UNITED STATES PATENT AND TRADEMARK OFFICE
CERTIFICATE OF CORRECTION

PATENT NO. : 5,557,365
DATED : September 17, 1996
INVENTOR(S) :
TOSHIFUMI OHSAWA It is certified that error appears in the above-indentified patent and that said Letters Patent is hereby corrected as shown below:

Column 28

Line 66, "claim 22," should read --claim 21,--.

Column 29

Line 9, "accessary" should read --accessory--.

Signed and Sealed this

Eleventh Day of March, 1997

Attest:

BRUCE LEHMAN

Attesting Officer

Commissioner of Patents and Trademarks